United States Patent
Heikkinen et al.

(10) Patent No.: US 11,936,711 B1
(45) Date of Patent: Mar. 19, 2024

(54) SYSTEMS AND METHODS FOR MEDIA DELIVERY IN COOPERATIVE DEVICE-TO-DEVICE COMMUNICATIONS

(71) Applicant: Rovi Guides, Inc., San Jose, CA (US)

(72) Inventors: Antti Heikkinen, Oulu (FI); Mikko Uitto, Oulu (FI)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/898,648

(22) Filed: Aug. 30, 2022

(51) Int. Cl.
G06F 13/00 (2006.01)
H04L 65/752 (2022.01)
H04L 65/80 (2022.01)
H04N 21/231 (2011.01)
H04N 21/2343 (2011.01)

(52) U.S. Cl.
CPC ........... H04L 65/752 (2022.05); H04L 65/80 (2013.01); H04N 21/23106 (2013.01); H04N 21/23439 (2013.01)

(58) Field of Classification Search
CPC . H04L 65/752; H04L 65/80; H04N 21/23106; H04N 21/23439
USPC ........ 709/239, 238, 243, 232, 233, 201, 231
See application file for complete search history.

(56) References Cited

U.S. PATENT DOCUMENTS

| | | | | |
|---|---|---|---|---|
| 8,447,875 | B2 * | 5/2013 | Liu | H04L 65/80 370/312 |
| 10,594,760 | B2 * | 3/2020 | Madani | H04L 67/561 |
| 2011/0225311 | A1 * | 9/2011 | Liu | H04L 45/125 709/231 |
| 2011/0225312 | A1 * | 9/2011 | Liu | H04N 21/632 709/231 |
| 2015/0019649 | A1 | 1/2015 | De Foy et al. | |
| 2018/0213018 | A1 * | 7/2018 | Madani | H04L 67/561 |
| 2022/0191260 | A1 * | 6/2022 | Yousef | H04L 65/80 |

FOREIGN PATENT DOCUMENTS

| | | |
|---|---|---|
| CN | 106817721 A | 6/2017 |
| WO | 2021034691 A1 | 2/2021 |
| WO | 2021254358 A1 | 12/2021 |

OTHER PUBLICATIONS

U.S. Appl. No. 17/898,647, filed Aug. 30, 2022, Antti Heikkinen. "Information Technology—Dynamic adaptive streaming over HTTP(DASH)—Part 5: Server and network assisted DASH (Sand)," SO/IEC 23009-5 (2017) (5 pages).

(Continued)

*Primary Examiner* — Kenneth R Coulter
(74) *Attorney, Agent, or Firm* — Haley Guiliano LLP

(57) ABSTRACT

A sidelink connection is created between each device of a plurality of devices. If the sidelink connection quality is not sufficient to transmit a first version of a segment encoded at a first quality level, a lower quality version of the segment may also be retrieved. The lower quality version of the segment may be retrieved by a different device than the device that retrieved the first version of the segment. If the segment is requested from a first device by a second device and the sidelink connection between the first device and the second device is not sufficient to transmit the first version of the segment, the first device may cause transmission of the lower quality version of the segment retrieved by a third device to the second device.

20 Claims, 15 Drawing Sheets

(56) References Cited

OTHER PUBLICATIONS

Ahmed et al., "Video Transmission Using Device-to-Device Communications: A Survey," IEEE Access, 7:131019-131038 (2019).
Bakker, et al., "Peer-to-Peer Streaming Peer Protocol (PPSPP)," [retrieved on May 23, 2023 from URL: https://www.fc-editor.org/rfc/rfc7574.html] (85 pages).
Cruz, et al., "Peer-to-Peer Streaming Peer Tracker (PPSTP)," [retrieved on May 23, 2023 from URL: https://www.rfc-editor.org/rfc/rfc7846.html] (55 pages).
Fecheyr-Lippens, "A review of http live streaming," Internet citation (2010) (30 pages).
Mohan et al., "Active and Passive Network Measurements: A Survey," International Journal of Computer Science and Information Technologies, 2(4):1372-1385 (2011).
Stockhammer et al., "Dynamic adaptive streaming over HTTP standards and design principles," ACM MMSys'11 (2011) (3 pages).
Thomas et al., "Enhancing MPEG dash performance via server and network assistance," IET Conference Proceedings, 1-8 (2015).
Zhang, et al., "DECOMOD: collaborative DASH with download enhancing based on multiple mobile devices cooperation," Proceedings of the 5th ACM Multimedia Systems Conference, 160-163 (2014).
Al-Habashna, A., et al., "QoE awareness in progressive caching and DASh-based D2D video streaming in cellular networks," Wireless Networks, 26:2051-2073 (2020).
Girici, T., et al., "Cluestering-Based Device-To-Deivce Discovery and Content Delivery in Wireless Networks," ITU Journal on Future and Evolving Technologies, 2(2):21-33 (2021).
Song, Y., et al., "QoE-Driven Distributed Content Segments Sharing with Service Differentiation in D2D Network," IEEE, 75-80 (2020).
Zammit, J., et al., "Efficient Transmission of Live Multi-View Video in LTE-A Cellular Networks using D2D Cooperation," 2020 IEEE 20th MELECON, 169-174 (2020).

\* cited by examiner

SYSTEMS AND METHODS FOR MEDIA DELIVERY IN COOPERATIVE DEVICE-TO-DEVICE COMMUNICATIONS

BACKGROUND

This disclosure is directed to media delivery in device-to-device communications. In particular, techniques are disclosed for using sidelinks among devices in a cluster to cache segments of the media and to deliver cached segments from one device to another device in the cluster.

SUMMARY

Consumers have devices such as mobile phones and head-mounted displays (HMDs) that can utilize media services with high quality, e.g., ultra-high definition (UHD) videos, even with extended reality (XR) content where compressed bitrates can be several megabits per second. For instance, in adaptive streaming, the media content is split into temporal segments, the order and quality of which are defined in a manifest file. Thus, the segments may be individually requested by the client device. The devices usually have multiple network interfaces allowing them to be connected at the same time to multiple networks (e.g., mobile, WLAN) or directly to other devices using device-to-device (D2D) or sidelink (SL) connections.

Mobile network capacity and coverage can vary, especially in sparsely populated areas or in rural areas, which can degrade the service and video quality. The device may be outside of a network coverage area so there is no access to the services. In addition, the mobile network operators (MNOs) provide unlimited data plans, which may increase the load of a cellular network (e.g., LTE, 5G) also in urban areas. WLAN networks may have low throughput to the internet if the access network capacity is insufficient or the backhaul connection is weak. The capacity may not be designed for peak periods or for use by multiple simultaneous users, for example, video services requested at the same time from free Wi-Fi in restaurants. Also, some video users can have a poor public network connection, but, on the other hand, a strong D2D or sidelink connection, which could be utilized for video retrieval. The backhaul connection to the internet may be a bottleneck when it is established using a mobile network, limited local area network (LAN), or satellite connection. Usually, traffic peaks occur when a large group of people access popular streaming content simultaneously, for example, during popular live events, such as live streams from sports events or interviews of noteworthy persons. Consumers are using more and more live media services on mobile devices, and they are expecting to receive high-quality video regardless of their location.

When several users are streaming the same content at the same time, network capacity is insufficient, or the device is outside of a network coverage area, several problems can arise. For example, there may be stalling and/or substantial quality fluctuation in a video session resulting in a low quality of experience (QoE) for the user. There may be unnecessary bandwidth and energy consumption if the same segments are streamed several times. Overloading the network or the server may result in no access to the streaming service (e.g., due to high loads at the server, service provider, mobile network operator (MNO) or mobile virtual network operator (MVNO)), or loss of internet connection at the device.

In a wireless system, a user equipment (UE) can communicate via uplink and downlink with a base station (eNB, gNB, Wi-Fi base station) in a wireless communication network. According to 3GPP, the air interface connecting UE and eNB in LTE, and gNB in 5G, is called the Uu interface. In addition, a UE can communicate with one or more UEs directly by device-to-device (D2D) or sidelink (SL) communication through sidelink channels. D2D or SL communication among UEs is becoming more and more important for information exchange in wireless communication systems. SL communication enables direct communication between proximate devices, for instance multiple UEs, without going through the base station. That means cars, robots and even consumer devices could create their own ad hoc networks without using the radio access network as an intermediary. SL communication is part of a wireless communication system based on 3GPP Rel-16, Rel-17, or beyond. SL solutions support unicast, groupcast, and broadcast communication. SL includes synchronization signals for the connected UE devices. In addition, SL can be used to extend network coverage by using a UE as a SL relay. The SL relay can be implemented as follows: the relay UE connects a remote UE to the network, or the relay UE connects a first remote UE to a second remote UE.

The UE may use different access networks simultaneously or select a network to be used for a particular service, e.g., video streaming. For example, multiple client devices are connected to a Wi-Fi network (e.g., 802.11n, 802.11ac, 802.11ax) or to a cellular network (e.g., LTE, 5G) and at the same time connected to other UEs via a sidelink. It would be desirable to optimize the streaming of media content to a client device by exploiting multiple alternative network connections on different devices.

Media content is commonly delivered to users in temporally segmented form and, for instance, in HTTP adaptive streaming such as DASH or HLS, the media content is made available in short media segments at different qualities (bitrates) when a client can optimize the viewing experience by matching the quality of video against fluctuating network conditions. The media content is commonly delivered using content delivery networks (CDNs), which cache media segments from the content server (origin) to the edge server's cache. In the mobile networks the edge server can be located close to the base station in the multi-access edge (MEC) to improve service latency and quality as well as to ensure efficient networking. In addition, the idea of caching popular videos to UEs and sharing them with other users via D2D communication to reduce backhaul traffic has been proposed. In D2D caching, two main aspects are cache placement and content delivery. In the cache placement it is decided which files should be cached in which base stations or UEs. In content delivery it is decided how to send the files from the cache to UEs. D2D or sidelink communication can possess higher capacity for the video distribution.

Public mobile networks are provided by MNOs or MVNOs (Mobile Virtual Network Operators). MNO owns the network and delivers services to subscribers. In addition, an MNO may also sell access to network services to the MVNO, who can deliver the services for their own subscribers. The MVNOs do not own the network, and they pay a fee to the MNO based on tonnage/usage by their subscribers. The subscriber connects the devices to the network using e-sim or sim provided by the MNO or MVNO.

Server and network assisted DASH (SAND) introduces messaging functionalities for improving the streaming performance and caching between the DASH clients as well as bringing more intelligence to the edge caches. For example, the client can send metric messages about connection QoS to the metric server and receive messages that contain parameters enhancing reception.

The solution to the above problems provided herein includes systems and methods to select the active UE for distributed media delivery from a plurality of UEs connected to each other by a D2D or SL connection forming a cluster (or group). The systems and methods utilize network connections of multiple UEs that are interconnected by a sidelink to form a D2D cluster and to optimize video streaming when network connectivity to the content server or CDN is limited, variable, or missing from a single UE. The cache is distributed among the UEs in the cluster, and it is populated based on the connection metrics shared between UEs when all UEs have the same metric information available. Each UE includes a cooperative media delivery system which selects one or more UEs from a plurality of UEs based on the shared metric information to download next media segment(s) from the content server and stores the segments to their own cache where other UEs can download them. The selection takes place synchronously on all UEs.

A simple use case to describe how the solution could work follows. Three UEs start live media streaming by informing other UEs in the D2D cluster. Each UE also periodically sends metric information to other UEs about its connection quality. Thus, all UEs have the same metric information available. Each UE runs a media application with a cooperative media delivery system that has information about the content server address and other UEs' local cache addresses inside the D2D cluster. The cooperative media delivery system in each UE runs an identical decision process to decide how to get the next segment from the content server. The identical decision process can be considered as mutual intelligence between the UEs. In the first cycle, based on the shared network status/metric information, the media applications on UE1, UE2, and UE3 make an identical decision synchronously that UE1 will download the next segment from the content server via a mobile operator network and store the segment in its local cache. UE2 and UE3 download the segment from UE1's cache via the sidelink connection. In the second cycle, based on the updated network status/metric information, each media application running on UE1, UE2, and UE3 makes an identical decision that UE2 will download the next segment from the content server via a second mobile operator network and store the segment in its local cache. UE1 and UE3 download the segment from UE2's cache via the sidelink connection. This is repeated until the media session ends.

Systems and methods are described herein for media delivery in cooperative D2D communications. A sidelink connection is created between each device of a plurality of devices. At least a first device of the plurality of devices is connected to a content source and at least a second device of the plurality of devices is not connected to the content source. The first device retrieves a manifest file for the media from the content source. The first device then notifies other devices, including the second device, that the manifest file is available from the first device. Based on connection metrics of each device, it is determined which of the devices has the highest quality connection to the content source. If, for example, the first device is determined to have the highest quality connection, then the first device retrieves a segment of the media from the content source, stores the segment in a cache of the first device, and delivers the segment to other devices in response to requests for the segment received from each device.

Before retrieving each segment of the media, the connection metrics of devices are used to determine which device has the highest connection quality. If another device is determined to have a higher connection quality with the content source, that device retrieves the next segment, stored the segment in its cache, and delivers the segment to other devices in response to requests for the segment from each device.

Network conditions of each device may be measured periodically. For example, the network conditions may be measured before each segment is retrieved, such as while a video player buffer is full and a segment is currently being played back by a video player. The connection metrics of each device are then updated based on the measurements. Once the connection metrics have been shared between all devices, each device determines simultaneously, based on the connection metrics, which device has the highest connection quality.

If the number of segments currently available in a video player buffer of a device is below a threshold number of segments, the device may determine whether a next segment is available from the cache of another device. If so, the segment is retrieved from the cache of the other device. To determine whether a next segment is available from the cache of another device, a request for the next segment is transmitted, via the sidelink, to at least one other device. In response, an indication is received from each device to which the request was transmitted whether the segment is available from that device. If an indication that the segment is available is received from more than one device, the sidelink connection quality between the requesting device and each device from which the segment is available is determined. A target device is then selected based on the sidelink connection quality, and the segment is retrieved from the cache of the target device.

In some cases, the sidelink connection quality may fluctuate over time and may sometimes be of higher quality (e.g., faster data throughput) than the network connection between the first device and the content source, and may sometimes be of lower quality (e.g., slower data throughput). If the sidelink connection quality is higher than the network connection quality, a segment may be delivered from the device connected to the content source to other devices via the sidelink, even if the other devices are also connected to the content source. If, however, the network connection quality between another device and the content source is higher than the sidelink connection quality between that device and the first device, the segment may be retrieved by that device from the content source instead.

In some cases, delivery of the segment from the first device to a second device occurs only if the sidelink connection quality is determined to be sufficient for such transmission. If the sidelink connection quality is not sufficient, it is determined whether the segment is currently stored in the cache of a third device. If the segment is currently stored in the cache of the third device, and if the sidelink connection between the second device and the third device is sufficient for transmission of the segment, the segment is delivered from the third device to the second device via the sidelink connection. If the segment is not currently stored in the cache of the third device, or if the sidelink connection between the second device and the third device is not sufficient to transmit the segment, it is determined whether a lower quality version of the segment is currently stored in the cache of any device of the plurality of devices. If so, the lower quality version of the segment is transmitted from the device at which it is currently stored to the second device.

The second device may subsequently establish a connection with the content source. It may be determined, based on connection metrics, that the connection between the second device and the content source is of higher quality than the connection between the first device and the content source. If so, the second device may be selected to retrieve the next segment of the media from the content source.

In some embodiments, if the sidelink connection quality is not sufficient to transmit a first version of a segment encoded at a first quality level, a lower quality version of the segment may also be retrieved. The lower quality version of the segment may be retrieved by a different device than the device that retrieved the first version of the segment. If the segment is requested from the first device by a second device and the sidelink connection between the first device and the second device is not sufficient to transmit the first version of the segment, the first device may cause transmission of the lower quality version of the segment retrieved by a third device to the second device. For example, the first device may instruct the second device to request the segment from the third device. Alternatively, the first device may instruct the third device to transmit the lower quality version of the segment to the second device. In some embodiments, the third device may notify other devices in the D2D cluster that the lower quality version of the segment is available from the third device. The first quality level may be selected based on the connection quality between the first device and the content source, while the lower quality level may be selected based on the sidelink connection quality. In some embodiments, the sidelink connection quality may vary widely between each pairing of devices. In such cases, multiple versions of each segment may be retrieved at different quality levels based on the various sidelink connection quality levels. If there are enough devices in the D2D cluster that are connected to the content source, segments may be retrieved for every selected quality level. If not enough devices are connected to the content source, then a subset of quality levels may be retrieved such that all devices retrieving segments via the sidelink will have access to versions for which their respective sidelink connections are sufficient.

If an increase in the sidelink connection quality level is detected, it is determined whether the increase results in a sufficient connection quality for transmission of the first version of the segment. If so, only the first version of the next segment is retrieved from the content source. Otherwise, the lower quality version(s) of the next segment are retrieved.

BRIEF DESCRIPTION OF THE DRAWINGS

The above and other objects and advantages of the disclosure will be apparent upon consideration of the following detailed description, taken in conjunction with the accompanying drawings, in which.

DETAILED DESCRIPTION

The cache selection element (CASE) with caching capability utilizes user equipment's capability to connect one or more UEs directly by D2D or SL communication, forming a cluster of UEs. This cluster may be referred to as a cooperative streaming environment. At the same time, one or more UEs may connect to the public network. At least one of the UEs in the cluster should have access to the content server via a public network (e.g., LTE, 5G, Wi-Fi). UEs may use the same or different network operators. Each UE includes a cache selection element enabling multi-user collaborative media streaming. The cache selection element may monitor the quality of the available public networks in the UE as well as the SL capacity using passive and active network estimation techniques and may function similarly to a radio network information service (RNIS) or utilize such a service from another network node. Signal quality indicators (e.g. Received Signal Strength Indicator (RSSI), Reference Signal Received Power (RSRP), Sidelink Received Signal Strength Indicator (S-RSSI), Sidelink Reference Signal Received Power (S-RSRP)) and packet information (e.g. response times) can be used. In addition, the cache selection element may use information of available mobile network operators' networks and information of the connected users, and share the network usage by number of users in each mobile network operator (MNO)'s network. The CASE in each UE sends connection quality information periodically via SL to other UEs if more than one UE has access to the content server via public network. Thus, the CASE in each UE has the same information at its use for decision making. The CASE with caching capability decides which UEs cache is used to get the media segment. If the selected cache is on the same UE then the media segment is downloaded from the public network and stored in the media player's buffer and local cache for a certain time for other UEs. In addition, the UE may act as an assistant, in which case it does not play the video. The UE may send information about cached segments in the UEs own cache to other UEs allowing UEs later connected to the service to retrieve segments to the video player buffer.

Figure 1:
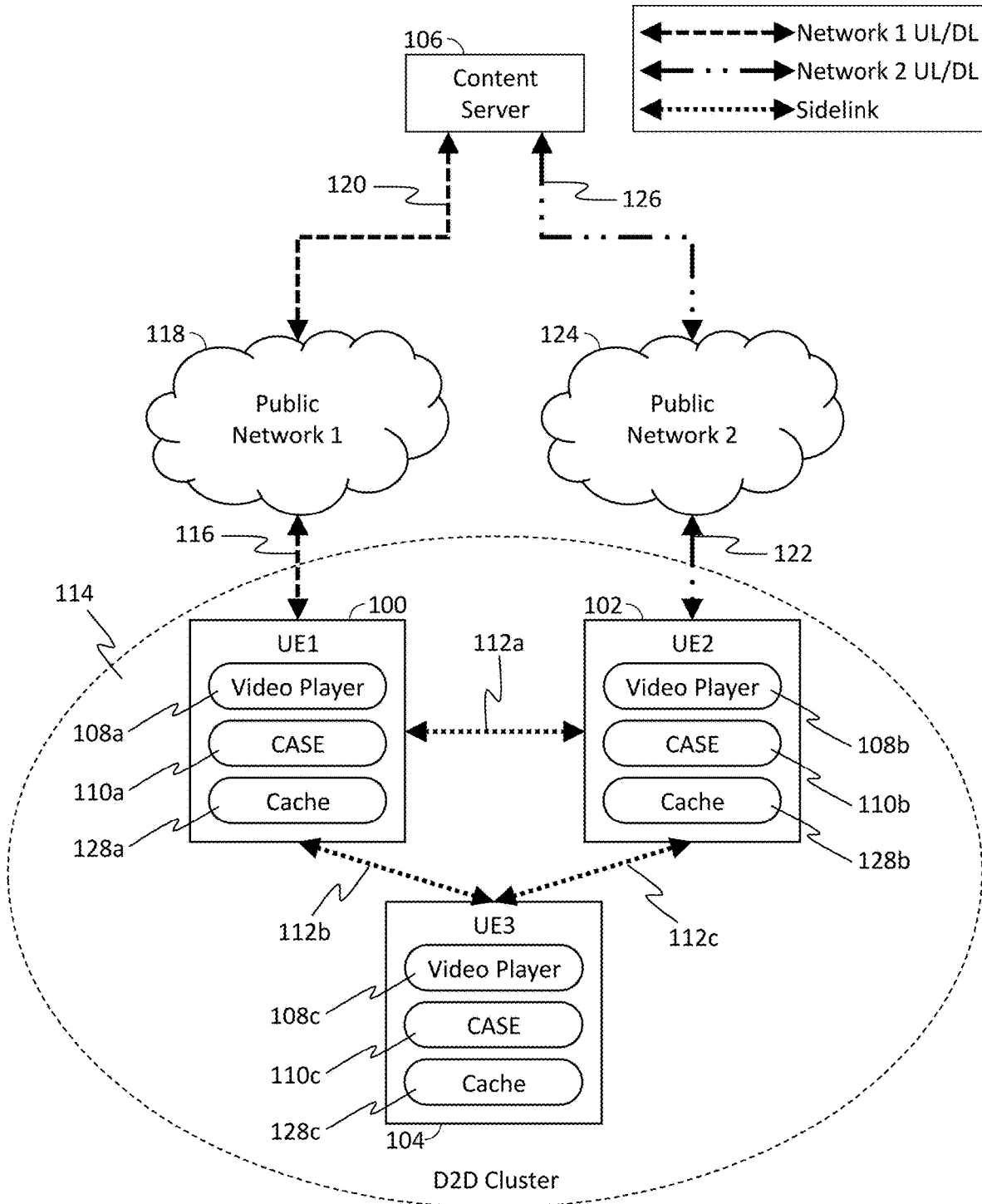
FIG. 1 shows an example cooperative streaming environment, in accordance with some embodiments of the disclosure.

FIG. 1 shows an example cooperative streaming environment, in accordance with some embodiments of the disclosure. UE1 100, UE2 102, and UE3 104 are each streaming a content item from content server 106. Each UE comprises a video player (108a-c) and a CASE (110a-c). UEs are connected to each other by sidelink connections 112a-c, thereby forming D2D cluster 114. In the example of FIG. 1, UE1 and UE2 each have a connection to content server 106 via a different public network. UE1 100 connects 116 to public network 1 118, which in turn connects 120 to content server 106. Similarly, UE2 102 connects 122 to public network 2 124, which in turn connects 126 to content server 106. UE3 104 has only SL connections 112b and 112c to UE1 and UE2, respectively, and does not have a direct network connection to content server 106. While in the example of FIG. 1 there are three UEs connected to form D2D cluster 114, it is noted that any number of UEs can form a D2D cluster.

When streaming the content item, the video player of each UE requests individual segments of the content item from content server 106. A manifest file is used by each video player to identify each segment of the content and to construct requests for each segment for transmission to content server 106. A video player in each of UE1, UE2, and UE3 starts live media streaming (e.g., HTTP Adaptive Streaming) by starting, or initializing, a CASE in the respective UE. UEs (e.g., UE1-UE3 100-104) connect to each other via SL (112a-c) to form D2D cluster 114. Each UE sends a subscription message to other UEs in the cluster. The subscription message may contain information such as an identifier of the UE, address of the UE, a flag indicating access to a public network, cache address within the UE, and manifest filename stored in a cache (128a-c) of the UE. The UEs periodically send connection quality information via SL (112a-c) to all the other UEs in D2D cluster 114. Unicast or groupcast can be used by each UE to transmit the connection quality information to each other UE. The CASEs in each UE (110a-c) decides synchronously (i.e., each CASE decides cooperatively and substantially simultaneously), based on the shared connection quality information, into which UE's cache the segment will be populated and stored. UEs may synchronize their local clocks according to UTC-Timing elements in the media stream received from content source 106 or using SL synchronization signals either directly through, for example, a 5G Next Generation Node B (gNB) or indirectly via other SL UEs. Each CASE can make the decision based on the connection quality of both public networks and sidelinks. For example, a CASE may estimate a transmission quality in each network based on a video segment received through a public network. It can also take advantage of the capacity of all networks to get the best possible quality. In addition, the CASE may use the shared information to select optimal representation (bitrate) if there are multiple versions of the segment available in the content server. Thus, the highest quality segment that an available public connection allows can be downloaded to the D2D cluster. The adaptive streaming technique may be MPEG-DASH, and the cache selection element may be a DASH-aware Network Element (DANE) with capabilities described in this disclosure.

Figure 2:
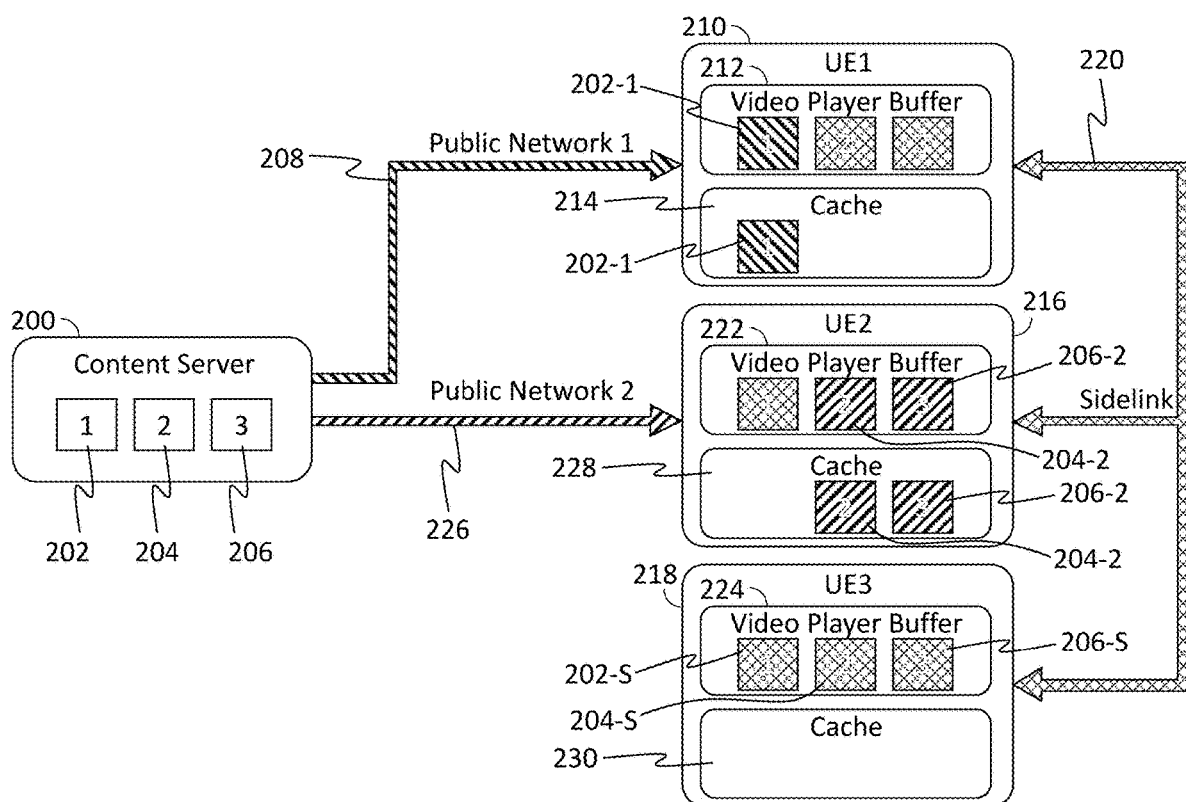
FIG. 2 shows an example of cooperative streaming between three UEs, in accordance with some embodiments of the disclosure.

FIG. 2 shows an example of cooperative streaming between three UEs, in accordance with some embodiments of the disclosure. Content server 200 hosts content items for streaming to UEs. Each content item may be divided into a plurality of segments, such as segment 1 202, segment 2 204, and segment 3 206. Each segment may contain, for example, two seconds of media data. Segment 1 202 may be transmitted over public network 1 208 to UE1 210. This may be in response to a CASE deciding, based on connection quality information, that UE1 210 should request segment 1 from content server 200. UE1 210 places a copy of segment 1 202-1 into video player buffer 212 to be played back by a video player of UE1 and stores a copy of segment 1 202-1 in cache 214. UE2 216 and UE3 218 can then request, via sidelink 220, the copy 202-1 of segment 1 from UE1 210. UE1 210 transmits copy 202-1 of segment 1, via the sidelink to UE2, where it is placed into video player buffer 222, and UE3, where it is placed into video player buffer 224.

The CASE may then determine that UE2 216 should request segment 2 204. UE2 216 receives segment 2 via public network 2 226. Copy 204-2 of segment 2 is placed into video player buffer 222 of UE2 216, as well as in cache 228 of UE2 216. UE1 210 and UE3 218 can then request, via sidelink 220, copy 204-2 of segment 2. In response, UE2 216 transmits, via sidelink 220, copy 204-2 of segment 2 to UE1, where it is placed in video player buffer 212, and UE3, where it is placed in video player buffer 224. The CASE may again determine that UE2 216 should request the next segment, segment 3 206. Copy 206-2 of segment 3 is received via public network 2 226 and placed in video player buffer 222 and cache 228 of UE2 216. In response to requests from UE1 210 and UE3 218, copy 206-2 of segment 3 is transmitted, via sidelink 220, to UE1 210 and UE3 218, where it is placed in video player buffer 212 and video player buffer 224, respectively. Thus, the cache of each UE retains a copy of each segment retrieved by that UE from content server 200, while segments retrieved via sidelink 220 are not cached. Accordingly, in this example, video player buffer 224 of UE3 218 contains copies 202-S, 204-S, and 206-S retrieved from UE1 210 or UE2 216 while cache 230 of UE3 218 is empty. If UE3 218 subsequently connects, via a public network, to content server 200, UE3 may be selected by the CASE to retrieve segments of the content item. Those segments would be stored in cache 230 and shared with other UEs via sidelink 220.

Figure 3:
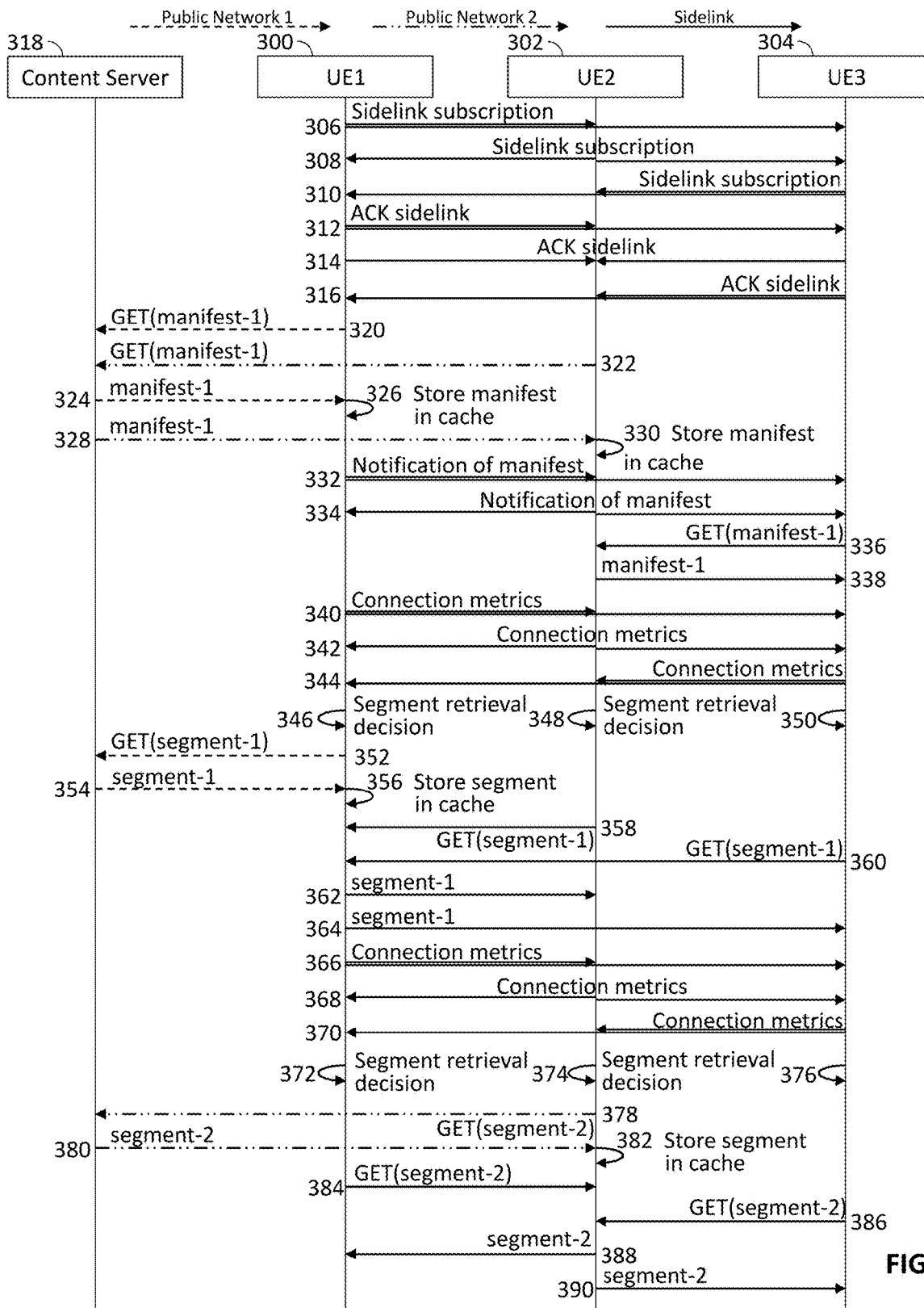
FIG. 3 is a sequence diagram showing data flow between components in a cooperative streaming environment, in accordance with some embodiments of the disclosure.

FIG. 3 is a sequence diagram showing data flow between components in a cooperative streaming environment, in accordance with some embodiments of the disclosure. UE1 300, UE2 302, and UE3 304 first form a cooperative streaming environment by mutually subscribing to a sidelink connection between them. At 306, UE1 300 transmits a sidelink subscription request to UE2 302 and UE3 304. At 308, UE2 302 similarly transmits a sidelink subscription request to UE1 200 and UE3 304. Likewise, at 310, UE3 304 transmits a sidelink subscription request to UE1 300 and UE2 302. At 312, UE1 300 acknowledges the sidelink subscription requests from UE2 302 and UE3 304. At 314, UE2 302 acknowledges the sidelink subscription requests from UE1 300 and UE3 304. At 316, UE3 304 acknowledges the sidelink subscription requests from UE1 300 and UE2 302.

UE1 300 is connected to public network 1, through which it may communicate with content server 318. UE2 302 is connected to public network 2, through which is may also communicate with content server 318. At 320, UE1 300 transmits a request (e.g., and HTTP GET request) for a manifest file associated with the content item to be streamed. At 322, UE2 302 similarly transmits a request for the manifest file. At 324, content server 318 transmits the requested manifest file to UE1 300. At 326, UE1 300 stores the manifest file in a local cache. At 328, content server 318 transmits the manifest file to UE2 302. At 330, UE2 302 stored the manifest file in a local cache. It is noted that, based on connection quality between each UE and the content server, different manifest files corresponding to different quality levels of the content to be streamed may be requested by different UEs. For example, UE1 300 may have a high quality connection that can support streaming of 4K content. UE1 300 may therefore request a manifest file specific to a 4K version of the content. UE2 302 may have a lower quality connection than that of UE1 that can support streaming of HD content (e.g., 1080i). UE2 302 may therefore request a manifest file specific to an HD version of the content.

At 332, UE1 300 transmits a notification to UE2 302 and UE3 304 that the manifest file is available from UE1 300. At 334, UE2 302 transmits a similar notification to UE1 300 and UE3 304 that the manifest file is available from UE2 302. At 336, UE3 304 transmits a request (e.g., an HTTP GET request) for the manifest file to UE2 302. At 338, UE2 302 responds to the request by transmitting the requested manifest file.

Once the sidelink is set up and all devices have received a copy of the manifest file, a CASE at each UE can determine which UE will retrieve the next segment. To do so, the CASE at each UE must evaluate connection metrics of the connection between each other UE and content server 318 and, in some embodiments, the sidelink connection between the respective UE and each other UE. Each UE may independently determine its connection metrics, such as bandwidth, download rate, upload rate, latency, or any other metric affecting connection performance, both between the respective UE and content server 318, and between the respective UE and each other UE or at least other UEs not connected to a public network. A UE may be connected to a public network with lower connection metrics (i.e., poorer performance) than the sidelink connection. In such cases, the UE will not be selected to retrieve the next segment.

At 340, UE1 300 transmits its connection metrics to UE2 302 and UE3 304. At 342, UE2 302 transmits its connection metrics to UE1 300 and UE3 304. At 344, UE3 transmits its connection metrics to UE1 300 and UE2 302. As UE3 is not connected to a public network, the connection metrics shared by UE3 304 relate only to the sidelink connection. At 346, 348, and 350, a CASE at each UE determines, synchronously, which UE should retrieve the next segment from content server 318, based on the connection metrics.

In the example of FIG. 3, it is determined that UE1 300 should retrieve the next segment. Thus, at 352, UE1 300 transmits a request for the next segment to content server 318. At 354, content server 318 transmits the requested segment to UE1 300 which, at 356, stores the received segment in a cache at UE1 300. UE1 300 may also place a copy of the segment in a video player buffer for playback by a video player of UE1 300. At 358 and 360, each of UE2 302 and UE3 304 transmits a request for the segment to UE1 300. At 362 and 364, UE1 300 transmits copies of the segment to UE2 302 and UE3 304.

At 366, UE1 300 transmits its connection metrics to UE2 302 and UE3 304. At 368, UE2 302 transmits its connection metrics to UE1 300 and UE3 304. At 370, UE3 transmits its connection metrics to UE1 300 and UE2 302. At 372, 374, and 376, the CASE at each UE determines, synchronously, which UE should retrieve the next segment from content server 318. In this example, based on the connection metrics of each UE, UE2 302 is selected to retrieve the next segment. At 378, UE2 302 transmits a request for the next segment to content server 318. At 380, content server 318 transmits the requested segment to UE2 302 which, at 382, stores the received segment in a cache of UE2. At 384 and 386, UE1 300 and UE3 304 transmit requests for the segment to UE2 302. At 388 and 390, UE2 302 transmits the requested segment to UE1 300 and UE3 304.

This process continues until streaming of the content is ended. Before retrieving each segment of the content, the CASE of each UE determines which UE should retrieve the next segment. The chosen UE then retrieves the segment and stores it in a cache at that UE. From there it can be shared with other UEs via the sidelink.

Figure 4:
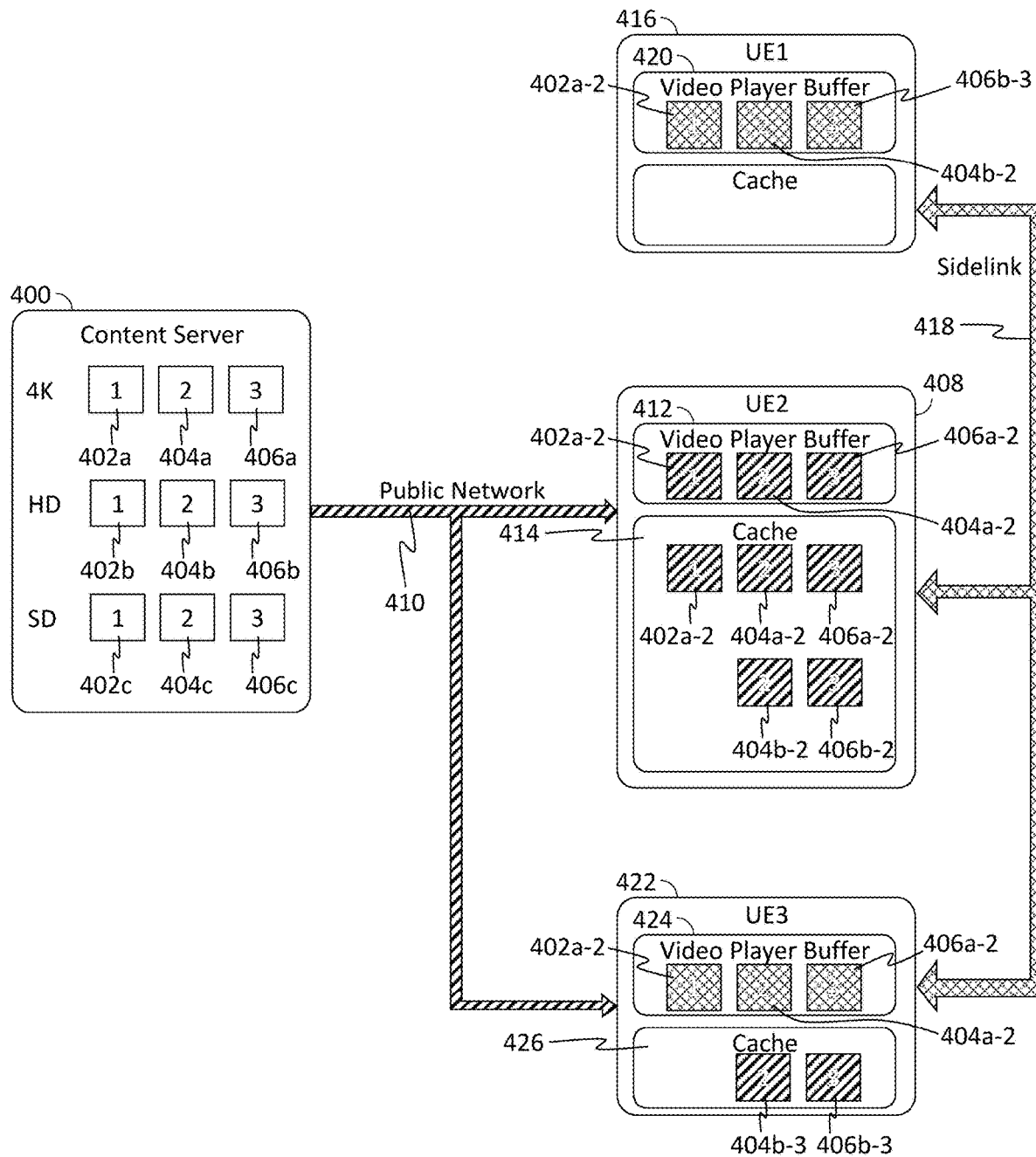
FIG. 4 shows an example of cooperative streaming between UEs when the sidelink connection quality is not sufficient to transmit segments at a first quality level, in accordance with some embodiments of the disclosure.

FIG. 4 shows an example of cooperative streaming between UEs when the sidelink connection quality is not sufficient to transmit segments at a first quality level, in accordance with some embodiments of the disclosure. Content server 400 may host multiple versions of each segment of the media. For example, a first version of a segment may be encoded in 4K resolution, while other versions of the same segment may be encoded in HD and SD resolutions. Different versions may also have different frame rates, different audio quality, or other differences that affect the amount of data needed to be transferred for each segment. In the example of FIG. 4, content server 400 hosts three different versions of segments 1, 2, and 3, with one version being an 4K version (402a, 404a, 406a), a second version being an HD version (402b, 404b, 406b), and a third version being an SD version (402c, 404c, 406c). UE2 408 may have the highest quality connection to content server 400 that is sufficient for transfer of 4K content. UE2 408 retrieves, via public network 410, a 4K version of a segment 402a-2, which is placed in video player buffer 412 for playback by UE2 408, and also stored in cache 414 for distribution to other UEs. UE1 416 retrieves segment 402a-2 from UE2 408 via the sidelink connection 418. Segment 402a-2 is then placed in video player buffer 420 of UE1 416 for playback. UE3 422 also retrieves segment 402a-2 from UE2 408 via sidelink connection 418. Segment 402a-2 is placed in video player buffer 424 of UE3 for playback.

Before retrieving a second segment from content server 400, the CASE of each UE measures not only the connection quality between each UE connected, via public network 410, to content server 400, but also the quality of the sidelink connection between each UE. The CASE may determine that the quality of the sidelink connection between UE1 416 and UE2 408 is not sufficient to transmit a 4K segment, while the sidelink connection between UE2 408 and UE3 422 is sufficient to transmit a 4K segment. Based on the sidelink connection quality, UE2 408 retrieves both a copy of a 4K version of segment 2 404*a*-2 and a copy of an HD version of segment 2 404*b*-2. The higher quality version (4K version 404*a*-2) is placed in video playback buffer 412 for playback, and both versions are stored in cache 414.

Based on the reduced quality of the sidelink connection between UE2 408 and UE1 416, UE1 416 retrieves, from UE2 408, via the sidelink, the lower quality version of segment 2 (HD version 404*b*-2), which is then placed in video player buffer 420 for playback. As the connection between UE2 408 and UE3 422 is still sufficient for transmission of 4K segments, UE3 422 retrieves, from UE2 408, via the sidelink, the higher quality version of the segment (4K version 404*a*-2), which is placed in video player buffer 424 for playback.

In some embodiments, rather than relying on a single UE to retrieve all versions of each segment, the CASE may determine that a UE having a connection quality level with content server 400 that is sufficient for transmission of lower quality segments should retrieve those segments. Thus, UE3 422, may retrieve, via public network 410, a copy of the lower quality segment 404*b*-3 for storage in cache 426. In this example, a copy of HD version of segment 3 406*b*-3 is retrieved by UE3 422 and stored in cache 426. UE3 422 continues to retrieve segments for playback from UE2 408 via sidelink 418. UE1 416, however, retrieves the HD copy of segment 3 406*b*-3 from UE3 422, which is placed in video player buffer 420 for playback.

Figure 5:
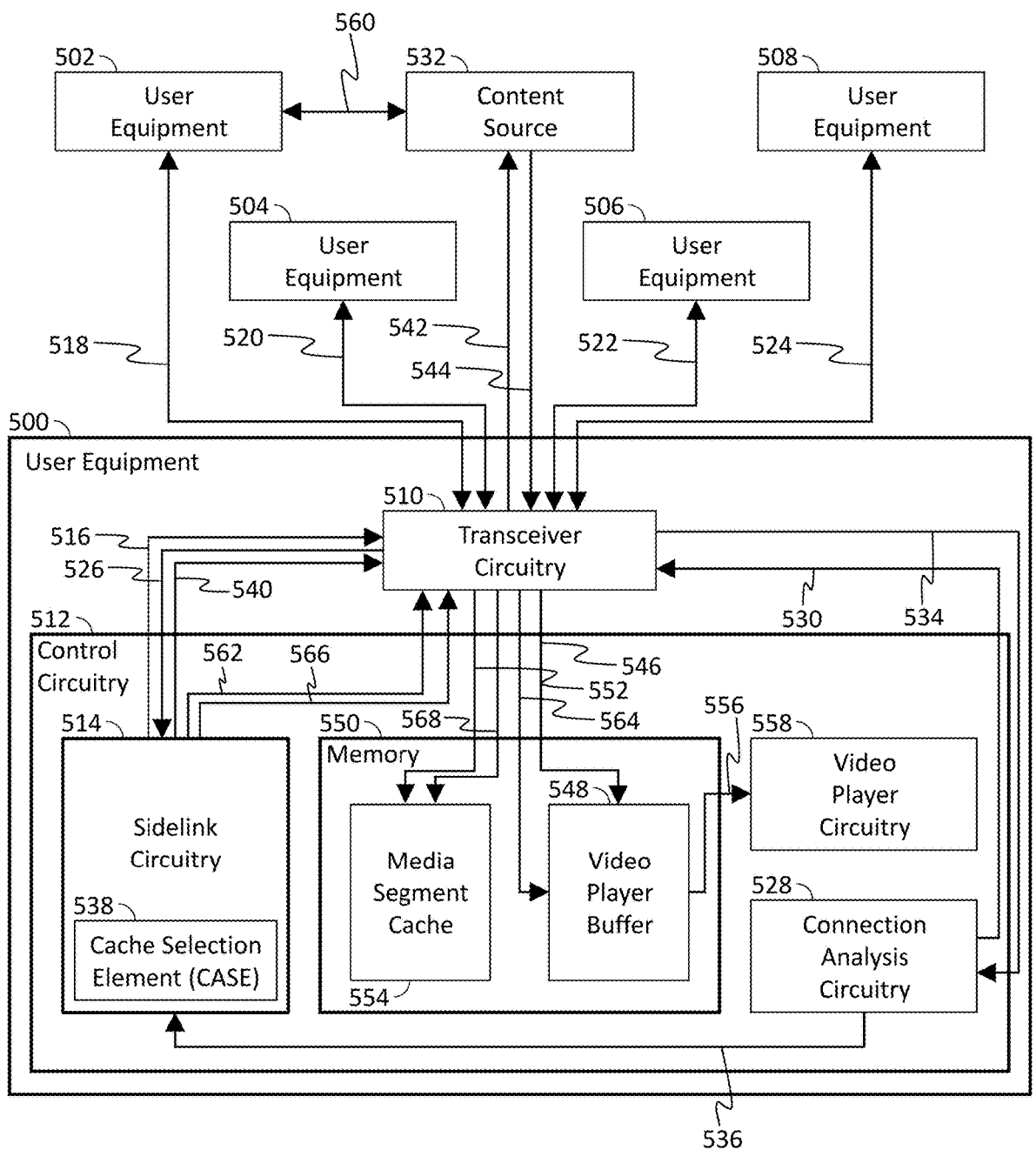
FIG. 5 is a block diagram showing components and data flow therebetween of a system for cooperative streaming, in accordance with some embodiments of the disclosure.

FIG. 5 is a block diagram showing components and data flow therebetween of a system for cooperative streaming, in accordance with some embodiments of the disclosure. User equipment 500 subscribes to a D2D cluster with user equipment 502, 504, 506, and 508. It will be appreciated that each of user equipment 502, 504, 506, and 508 has the same or similar components performing the same or similar functions as those described below in connection with user equipment 500. User equipment 500 includes transceiver circuitry 510 and control circuitry 512. Transceiver circuitry 510 comprises a network connection over which data can be transmitted to and received from remote devices, such as an ethernet connection, Wi-Fi connection, mobile broadband interface, or connection employing any other suitable networking protocol.

Control circuitry 512 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

User equipment 500 subscribes to the D2D cluster using sidelink circuitry 514. Sidelink circuitry 514 transmits 516, a subscription request to transceiver circuitry 510. Transceiver circuitry 510 transmits the subscription request to each of user equipment 502, 504, 506, and 508 via communication paths 518, 520, 522, and 524, respectively. Acknowledgements of the subscription request are received, via these communication paths, at transceiver circuitry 510, which in turn transmits 526 the acknowledgements to sidelink circuitry 514. In addition to the acknowledgment, subscription requests may also be received from other user equipment, and sidelink circuitry 514 may transmit an acknowledgement of the subscription request to any user equipment from which a subscription request was received.

Control circuitry 512, using connection analysis circuitry 528, determines connection metrics of various connections between user equipment 500 and other devices. Connection analysis circuitry 528 may determine metrics such as upload data rate, download data rate, latency, connection stability, or any other measure of connection performance. Connection analysis circuitry may transmit 530 a request to transceiver circuitry 510 for information describing the connection between user equipment 500 and content source 532 over a public network, such as a mobile broadband network, and/or the sidelink connection between user equipment 500 and each other user equipment 502, 504, 506, and 508. Transceiver circuitry 510 may periodically log data describing each connection or may perform new measurements in response to the request. Each other user equipment 502, 504, 506, and 508 also determines connection metrics for each of its connections. All connection metrics determined by each user equipment are shared with each other user equipment via the sidelink. Thus, transceiver circuitry 510 transmits the connection metrics to each other user equipment via communication paths 518, 520, 522, and 524. Transceiver circuitry 510 also receives connection metrics from each other user equipment via communications paths 518, 520, 522, and 524. Transceiver circuitry 510 then transmits 534 the connection metrics for all user equipment, including user equipment 500, to connection analysis circuitry 528.

Connection analysis circuitry 528 determines which UE has the highest quality connection to content server 532. Connection analysis circuitry 528 first identifies which UEs are connected to content server 532 and which UEs are only connected to the sidelink. The connection metrics of each UE that is connection to content server 532 are then processed by connection analysis circuitry 528. For example, connection analysis circuitry 528 may perform a simple comparison between relevant metrics of each UE, such as download data rate and latency. The UE with the highest download data rate may be determined as having the highest quality connection. If a set of UEs have the same download data rate, the UE with the lowest latency among the set of UEs may be determined to have the highest quality connection. In some embodiments, connection analysis circuitry 528 may consider the type of network connection. For example, a UE that is physically connected to a fiber optic network may perform better than a mobile device connected to a 4G mobile broadband network, even if both networks have comparable data throughput metrics because a physical connection is likely to be more consistent than a wireless connection due to movement of the mobile device into areas that may not be fully covered by the mobile network. After analyzing the connection metrics of each UE, connection analysis circuitry 528 may rank the UEs connected to content server 532 in descending order of connection quality. Connection analysis circuitry 528 transmits 536 the ranked list of connections to sidelink circuitry 514.

Cache selection element (CASE) 538 of sidelink circuitry 514 determines, based on the connection metrics, which user equipment should retrieve the next segment of the media from content source 532. If CASE 538 determines that user equipment 500 should retrieve the next segment, sidelink circuitry 514 transmits 540 a request for the next segment of the media to transceiver circuitry 510, which in turn transmits 542 the request to content source 532. In response to the request, content source 532 transmits 544 the requested segment of the media to user equipment 500, where it is received using transceiver circuitry 510.

Transceiver circuitry 510 transmits 546 the segment to video player buffer 548 which is located in memory 550. Memory 550 may be an electronic storage device. As referred to herein, the phrase "electronic storage device" or "storage device" should be understood to mean any device for storing electronic data, such as random-access memory, read-only memory, hard drives, optical drives, solid state devices, quantum storage devices, or any other suitable fixed or removable storage devices, and/or any combination of the same. Transceiver circuitry 510 also transmits 552 the segment to media segment cache 554 in memory 550. Once the segment is stored in the cache, it can be requested by, and transmitted to, other UEs via the sidelink connection (e.g., communication paths 518, 520, 522, and 524). Video player buffer 548 transfers 556 each segment stored therein to video player circuitry 558 for playback.

In some cases, another UE, such as user equipment 502, may also be connected to content source 532, e.g., via communication path 560. If CASE 538 determines, based on the connection metrics, that the connection between user equipment 502 and content source 532 is of higher quality than the connection between user equipment 500 and content source 532, user equipment 502 may be selected to retrieve the next segment of the media. Sidelink circuitry 514 then transmits 562 a request for the next segment to transceiver circuitry 510, which in turn transmits the request, via communication path 518, to user equipment 502. User equipment 502 retrieves the requested segment from its cache and transmits it, via communication path 518, to user equipment 500 where it is received using transceiver circuitry 510. Transceiver circuitry 510 then transmits 564 the segment to video player buffer 548 to be played back.

In some cases, the sidelink connection quality may differ between devices, and may fluctuate over time. When determining which UE should retrieve the next segment, CASE 538 analyzes connection quality between each UE and content source 532, if a connection exists between them (e.g., UE 502), as well as sidelink connection quality between each UE. When retrieving a segment from content source 532, a UE will request the highest quality segment that can be transmitted over that UE's connection with content source 532. However, there may be times when the sidelink connection quality between the UE that retrieves the segment and at least one other UE may not be sufficient to transmit the segment at the retrieved quality level. For example, user equipment 502 may have a higher connection quality, via communication path 560, with content source 532 than user equipment 500. As an example, the download data rate of the connection between user equipment 502 and content source 532 may be 60 Mbps, while the download data rate of the connection between user equipment 500 and content source 532 is only 30 Mbps. CASE 538 thus determines that user equipment 502 should retrieve the next segment, and user equipment 502 retrieves a copy of the segment at high quality level, such as 4K, based on the download data rate. The sidelink connection quality, however, between user equipment 502 and at least one other UE (including user equipment 500) may have a slower data transfer rate than 60 Mbps such that transmitting a 4K segment from user equipment 502 over that sidelink connection will take a long time and cause buffering issues for the receiving user equipment. For example, the sidelink connection may have a data transfer rate of 40 Mbps. CASE 538 may therefore determine that, in addition to user equipment 502 retrieving the next segment from content source 532, user equipment 500 should retrieve a lower quality version of the next segment as well. Sidelink circuitry 514 then transmits 566 a request for the lower quality version (though still the highest available quality that the sidelink connection can currently handle) to transceiver circuitry 510. Transceiver circuitry 510 transmits the request to content source 532 and receives the lower quality version of the segment in response. Transceiver circuitry 510 then transmits 568 the lower quality segment to media segment cache 554, from which it is made available to other UEs via the sidelink.

Figure 6:
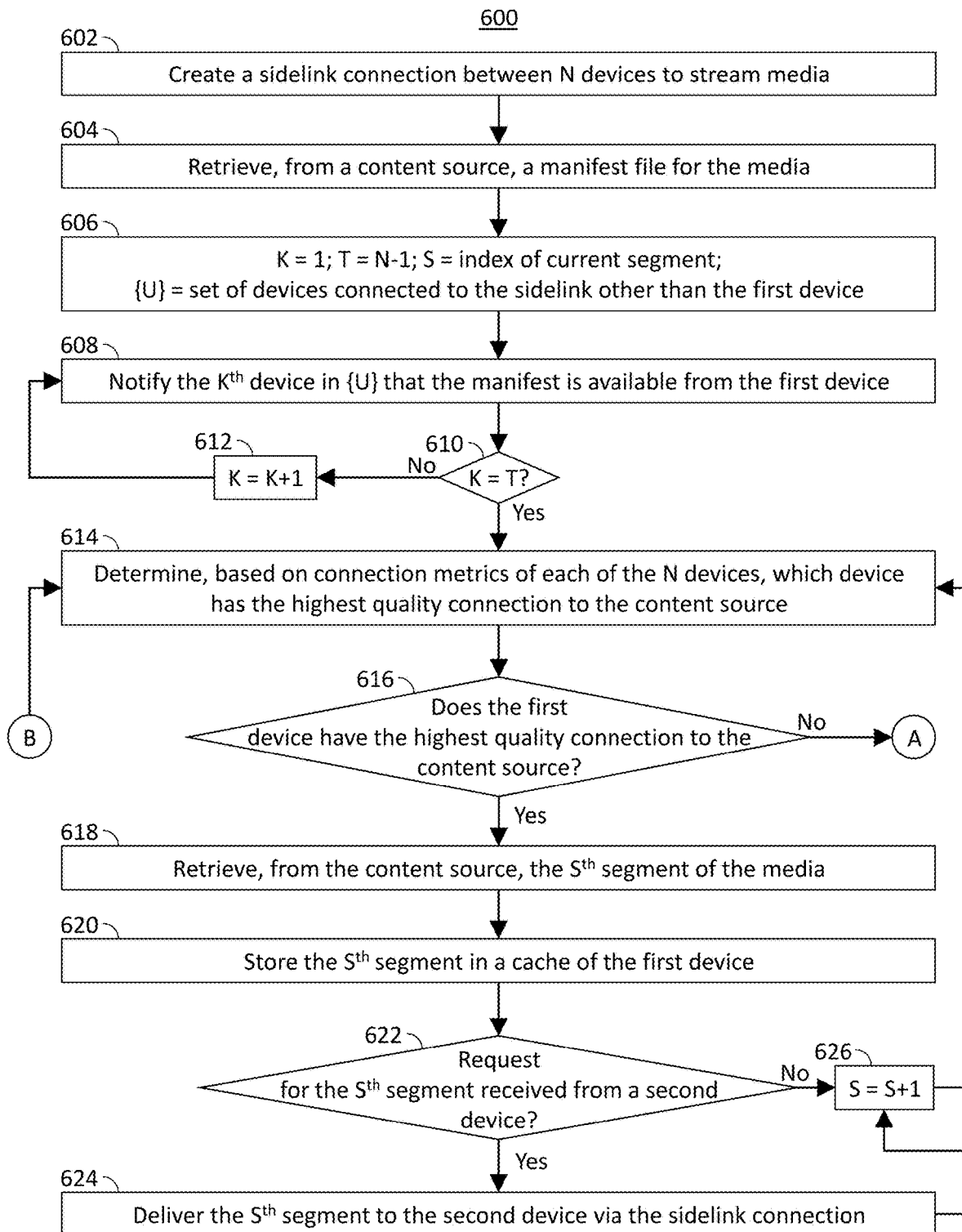
FIG. 6 is a flowchart representing an illustrative process for delivering segments of media to devices in a D2D cluster via a sidelink, in accordance with some embodiments of the disclosure.

FIG. 6 is a flowchart representing an illustrative process 600 for delivering segments of media to devices in a D2D cluster via a sidelink, in accordance with some embodiments of the disclosure. Process 600 may be implemented on control circuitry 512. In addition, one or more actions of process 600 may be incorporated into or combined with one or more actions of any other process or embodiment described herein.

At 602, control circuitry 512 creates a sidelink connection between N devices for the purposes of streaming media between them. For example, control circuitry 512 transmits a sidelink subscription message to each device connected to the same local area network or wireless network. The subscription message may include an identifier of the device on which control circuitry 512 resides ("the first device") as well as an identifier of the media to be streamed. An acknowledgement of the subscription may be received from every other device that also wants to stream the identified media. Control circuitry 512 may store identifiers of all acknowledging devices. Additionally, each other device that wants to stream the media may transmit sidelink subscription messages as well, and control circuitry 512 may transmit a similar acknowledgement. In this way, each device obtains identifiers of every device in the D2D cluster to be formed by the sidelink connections between them.

At 604, control circuitry 512 retrieves a manifest file for the media from a content source. For example, control circuitry 512 may transmit a request to the content source to stream the media. As a response to an initial request for any streaming media asset, the content source may transmit to the requesting device a manifest file for the media. The manifest file may include URLs or other resource locators for a plurality segments that make up the media.

At 606, control circuitry 512 initializes a counter variable K, setting its value to one, a variable T, setting its value to one less than the number of devices N in the D2D cluster, and a variable S representing an index of the current segment (i.e., a value of "1" for the first segment, "2" for the second segment, etc.). Control circuitry 512 also initializes a list, array, or other data structure {U} containing identifiers of the set of user equipment devices connected to the sidelink other than the first device.

At 608, control circuitry 512 notifies the $K^{th}$ device in {U} that the manifest is available from the first device. For example, control circuitry 512 may transmit a message to the $K^{th}$ device with a URL, memory address within the cache of the first device, or other pointer or locator for the manifest file. At 610, control circuitry 512 determines whether K is equal to T, meaning that all devices have been notified of the availability of the manifest file from the first device. If K is not equal to T ("No" at 610), then, at 612, control circuitry 512 increments the value of K by one, and processing returns to 608.

If K is equal to T ("Yes" at 610), then, at 614, control circuitry 512 determines, based on connection metrics of each of the N devices, which device has the highest quality connection to the content source. For example, control circuitry 512 may compare download speeds, available bandwidth, latency and/or other connection parameters of connections between each device and the content source. If no connection exists between a device and the content source, the parameter values for the connection may be set to zero.

At 616, control circuitry 512 determines whether the first device has the highest quality connection to the content source. For example, control circuitry 512 may sort the devices by connection quality in descending order and identify the device at the first position in the sorted list of devices. If the first device has the highest quality connection to the content source ("Yes" at 616), then, at 618, control circuitry 512 retrieves the $S^{th}$ segment of the media from the content source. For example, control circuitry 512 may transmit a request for the $S^{th}$ segment, using the corresponding resource locator provided in the manifest file, to the content source and receive, in response, a copy of the requested segment. At 620, stores the $S^{th}$ segment in a cache of the first device.

At 622, control circuitry 512 determines whether a request for the $S^{th}$ segment has been received from a second device. For example, control circuitry 512 may monitor incoming transmissions from the sidelink and determine whether any incoming transmission includes a request for the $S^{th}$ segment. If a request has been received ("Yes" at 622), then, at 624, the $S^{th}$ segment is delivered to the second device via the sidelink connection between the first device and the second device. After delivering the segment to the second device, or if no request was received ("No" at 622), at 626, control circuitry increments the value of S by one (to retrieve the next segment of the media), and processing returns to 614.

If control circuitry 512 determines that the first device does not have the highest quality connection to the content source ("No" at 616), then control circuitry 512 determines whether the $S^{th}$ segment is available from the cache of another device, as discussed below in connection with FIG. 7.

The actions or descriptions of FIG. 6 may be used with any other embodiment of this disclosure. In addition, the actions and descriptions described in relation to FIG. 6 may be done in suitable alternative orders or in parallel to further the purposes of this disclosure.

Figure 7:
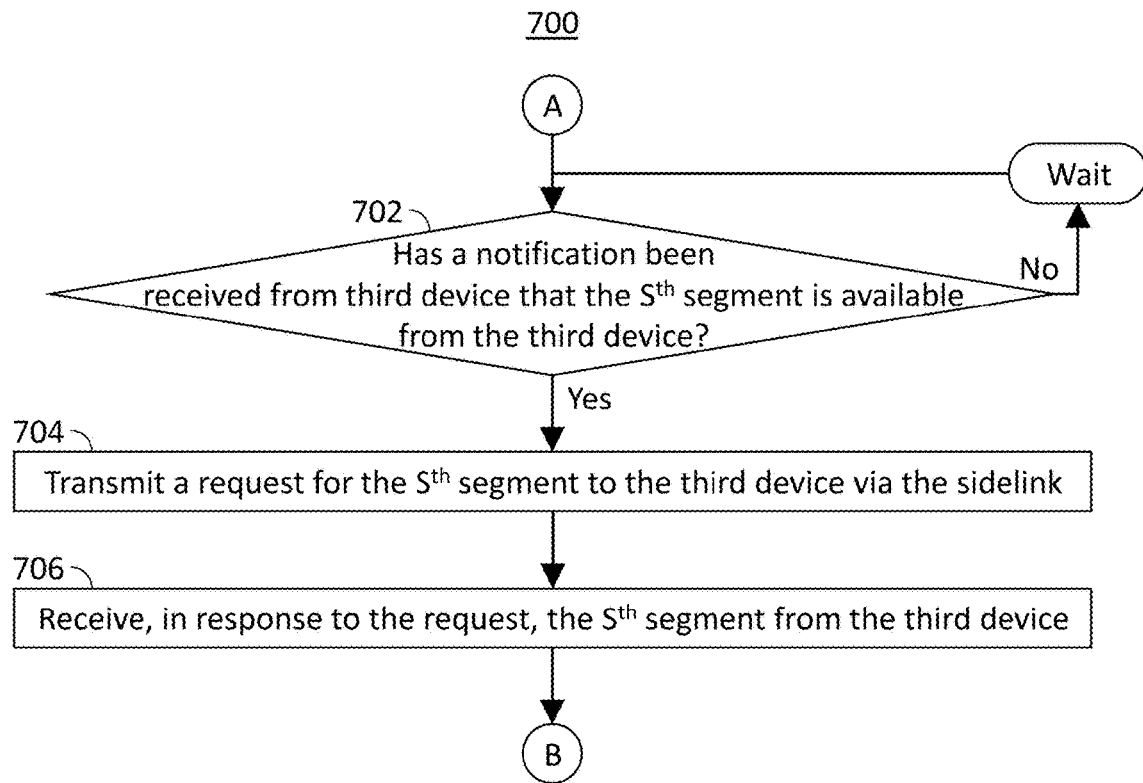
FIG. 7 is a flowchart representing an illustrative process for retrieving a segment of media from another UE, in accordance with some embodiments of the disclosure.

FIG. 7 is a flowchart representing an illustrative process 700 for retrieving a segment of media from another UE, in accordance with some embodiments of the disclosure. Process 700 may be implemented on control circuitry 512. In addition, one or more actions of process 700 may be incorporated into or combined with one or more actions of any other process or embodiment described herein.

At 702, control circuitry 512 determines whether a notification has been received from a third device that the $S^{th}$ segment is available from the third device. For example, control circuitry 512 may monitor incoming transmissions from the sidelink and determine whether a transmission has been received that indicates the availability of the $S^{th}$ segment. If no notification has been received ("No" at 702), then control circuitry 512 may wait for a predetermined period of time and then return to 702. For example, the third device may be in the process of retrieving the $S^{th}$ segment from the content server, but it may not yet have been fully downloaded by the third device, or not fully stored in the cache of the third device. Control circuitry 512 may wait for a short period, such as 100 milliseconds, before again determining whether a notification of the availability of the segment has been received.

If a notification of availability of the $S^{th}$ segment has been received ("Yes" at 702), then, at 704, control circuitry 512 transmits a request for the $S^{th}$ segment to the third device via the sidelink. For example, control circuitry 512 transmits an identifier of the $S^{th}$ segment or a memory address or other pointer or locator contained in the notification to the third device. At 706, control circuitry 512 receives, in response to the request, the $S^{th}$ segment from the third device. After receiving the $S^{th}$ segment from the third device, processing returns to 614 of FIG. 6, where it is again determined whether the first device has the highest quality connection to the content source. This determination is made prior to requesting each segment from the content source. Each UE makes this determination simultaneously and/or cooperatively, such that each UE makes the same determination as to which UE will retrieve the $S^{th}$ segment.

The actions or descriptions of FIG. 7 may be used with any other embodiment of this disclosure. In addition, the actions and descriptions described in relation to FIG. 7 may be done in suitable alternative orders or in parallel to further the purposes of this disclosure.

Figure 8:
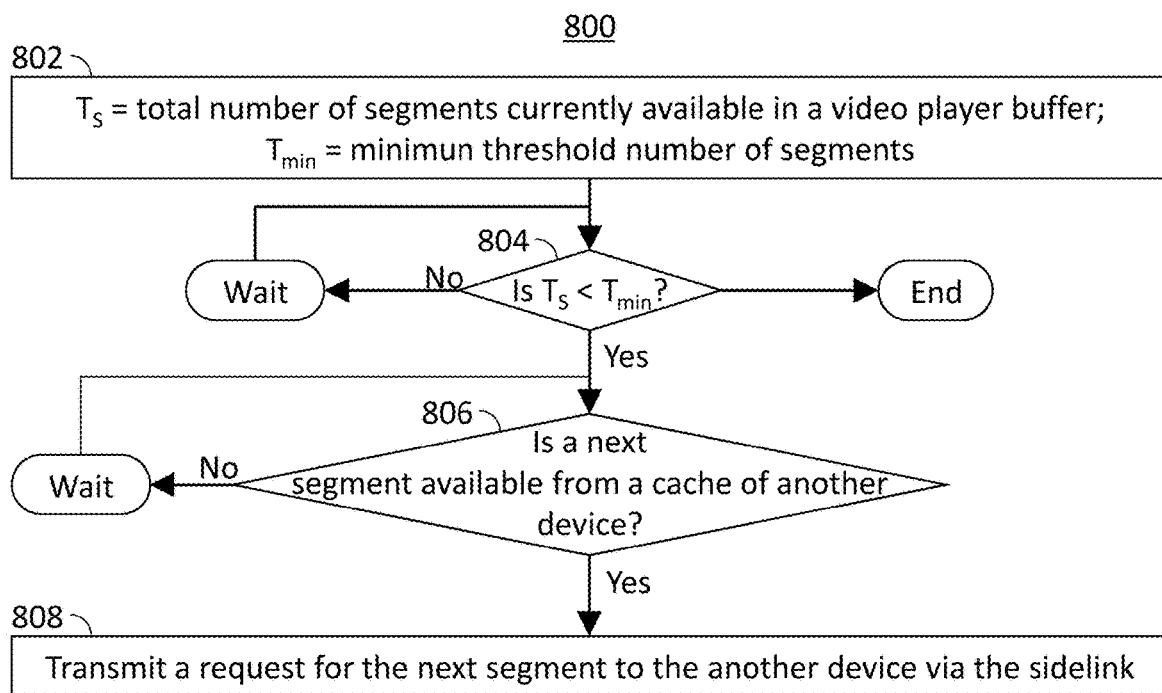
FIG. 8 is a flowchart representing an illustrative process for requesting an additional segment from the content source based on capacity of a video player buffer, in accordance with some embodiments of the disclosure.

FIG. 8 is a flowchart representing an illustrative process 800 for requesting an additional segment from the content source based on capacity of a video player buffer, in accordance with some embodiments of the disclosure. Process 800 may be implemented on control circuitry 512. In addition, one or more actions of process 800 may be incorporated into or combined with one or more actions of any other process or embodiment described herein.

At 802, control circuitry 512 initializes a variable $T_S$, representing the total number of segments currently available in a video player buffer, and a variable $T_{min}$ representing a minimum threshold number of segments. For example, control circuitry 512 may count the number of segments currently stored in the video player buffer. Alternatively, the video player buffer or the video player to which it feeds segments may maintain a counter of the number of segments currently stored in the buffer. In these cases, control circuitry 512 may simply retrieve the counter value. The value of $T_{min}$ may depend on the length of media contained in each segment, with an inverse relationship between segment length and the threshold number of segments. In other words, as segment length decreases, the threshold number of segments increases, and as segment length increases, the threshold number of segments decreases. As an example, segments may represent two seconds of media content, and the threshold may be fifteen segments (thus keeping at least thirty seconds of media content stored in the buffer at all times).

At 804, control circuitry 512 determines whether $T_S$ is less than $T_{min}$, meaning that there is a buffer underrun condition in which there are fewer than the threshold number of segments currently stored in the video player buffer. If $T_S$ is equal to or greater than $T_{min}$ ("No" at 804), then control circuitry 512 waits a predetermined amount of time, such as the length of a segment, before returning to 804. If $T_S$ is less that $T_{min}$ ("Yes" at 804), then, at 806, control circuitry 512 determines whether the next segment after the last segment stored in the video player buffer is available from the cache of another device in the D2D cluster. For example, control circuitry 512 may transmit a request to every device in the D2D cluster for whether the next segment is available and monitor incoming transmissions from the sidelink for an acknowledgement and/or indicator of the next segment. If the next segment is not available from any other device ("No" at 806), then control circuitry 512 waits a predetermined amount of time and then returns to 806 to determine if the segment has become available. If the segment is available from another device ("Yes" at 806), then, at 808, control circuitry 512 transmits a request for the next segment to the device from which it is available. In some cases, the segment may be available from more than one device. An illustrative method for requesting the segment from a device in these cases is described below in connection with FIG. 9.

The actions or descriptions of FIG. 8 may be used with any other embodiment of this disclosure. In addition, the actions and descriptions described in relation to FIG. 8 may be done in suitable alternative orders or in parallel to further the purposes of this disclosure.

Figure 9:
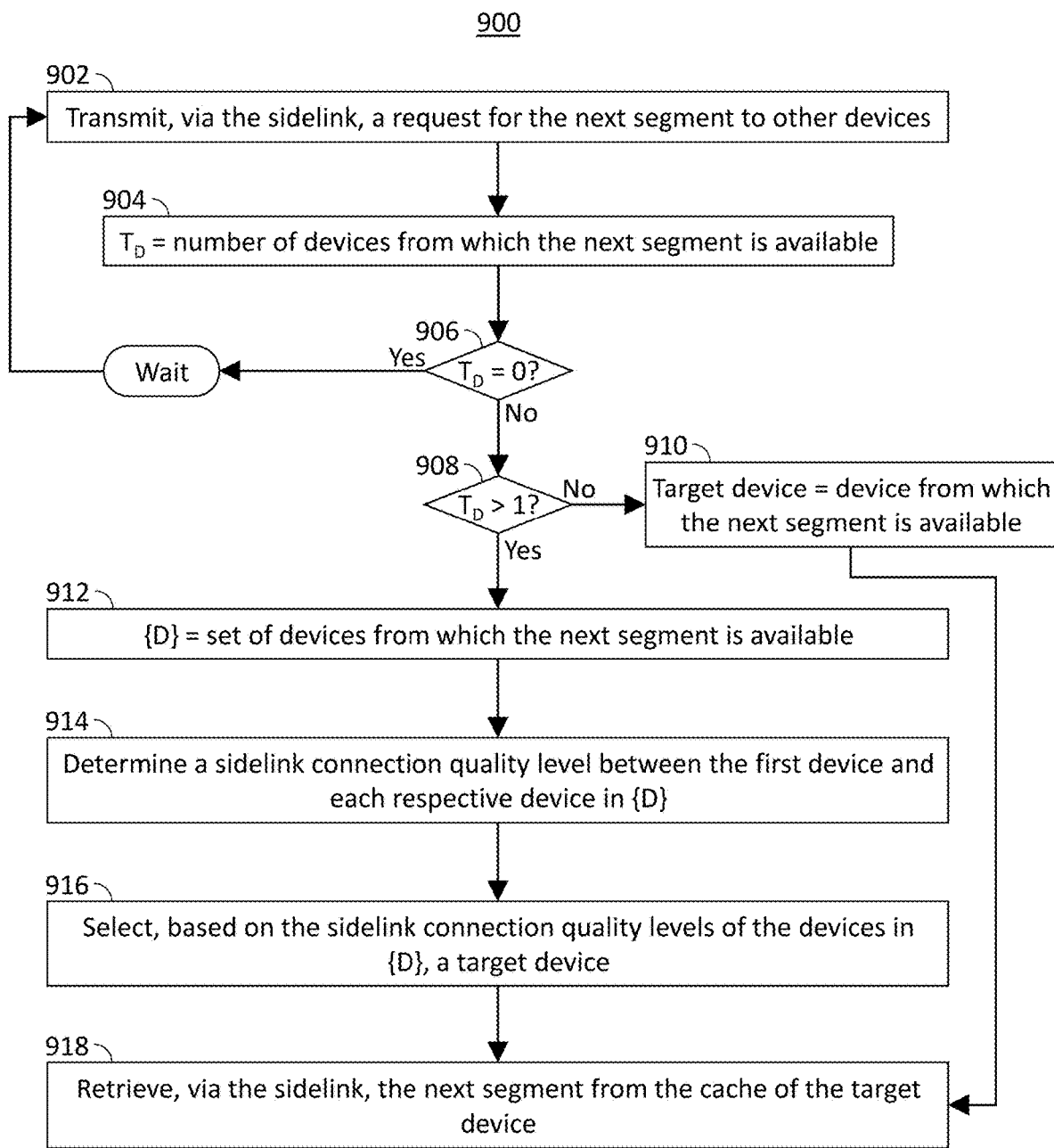
FIG. 9 is a flowchart representing an illustrative process for retrieving a segment from a UE when the desired segment is available from more than one UE, in accordance with some embodiments of the disclosure.

FIG. 9 is a flowchart representing an illustrative process 900 for retrieving a segment from a UE when the desired segment is available from more than one UE, in accordance with some embodiments of the disclosure. Process 900 may be implemented on control circuitry 512. In addition, one or more actions of process 900 may be incorporated into or combined with one or more actions of any other process or embodiment described herein.

At 902, control circuitry 512 transmits, via the sidelink, a request for the next segment to other devices in the D2D cluster. Any number of devices may respond with notifications that the requested segment is available from their respective caches, or the segment may not be available from any device. At 904, control circuitry 512 initializes a variable $T_D$ representing the number of devices from which the requested segment is available. At 906, control circuitry 512 determines whether $T_D$ is equal to zero, meaning that the requested segment is not available from any device. If so ("Yes" at 906), then control circuitry 512 waits for a predetermined amount of time before returning to 902, where a new request for the segment is transmitted to other devices in the D2D cluster.

If $T_D$ is not equal to zero ("No" at 906), then, at 908, control circuitry 512 determines whether $T_D$ is greater than one, meaning that the requested segment is available from more than one device. If $T_D$ is not greater than one, i.e., the requested segment is available from only one device ("No" at 908), then, at 910, control circuitry 512 identifies the one device as a target device from which the next segment is available. For example, the response from the one device to the request for the segment may include an identifier of the one device, such as an IP address, MAC address, IMEI number, or other unique device identifier. Control circuitry 512 may then store the identifier of the one device.

If $T_D$ is greater than one ("Yes" at 908), then, at 912, control circuitry 512 initializes a list, array, or data structure {D} containing identifiers of the set of devices from which the next segment is available. For example, the response from each device to the request for the segment may include an identifier of the one device, such as an IP address, MAC address, IMEI number, or other unique device identifier. Control circuitry 512 may then store the identifiers of each device from which the segment is available in {D}. At 914, control circuitry 512 determines a sidelink connection quality level between the first device and each respective device in {D}. This may be accomplished using methods similar to those used to determine connection metrics between UEs and the content source as described above in connection with FIG. 6, but applied to the sidelink connection between each pair of UEs. Thus, data transfer rates, latency, etc., may be determined for each sidelink connection. The raw values of each measurement may be scaled to aid in comparison between each connection. For example, 45 Mbps download data rate of a sidelink connection may be located on a scale from 0 Mbps to 100 Mbps, thus corresponding to a scaled value of 4.5.

At 916, control circuitry 512 selects, based on the sidelink connection quality levels of the devices in {D}, a target device. For example, control circuitry 512 may sort the devices in {D} by sidelink connection quality with the first device in descending order. The device in the first position of the sorted set of devices may then be selected.

Once a target device has been selected, at 918, control circuitry 512 retrieves, via the sidelink, the next segment from the cache of the target device. For example, control circuitry 512 transmits a request for the next segment to the target device using the device identifier of the target device and a segment index. In response to the request, the target device transmits the next segment to the first device.

The actions or descriptions of FIG. 9 may be used with any other embodiment of this disclosure. In addition, the actions and descriptions described in relation to FIG. 9 may be done in suitable alternative orders or in parallel to further the purposes of this disclosure.

Figure 10:
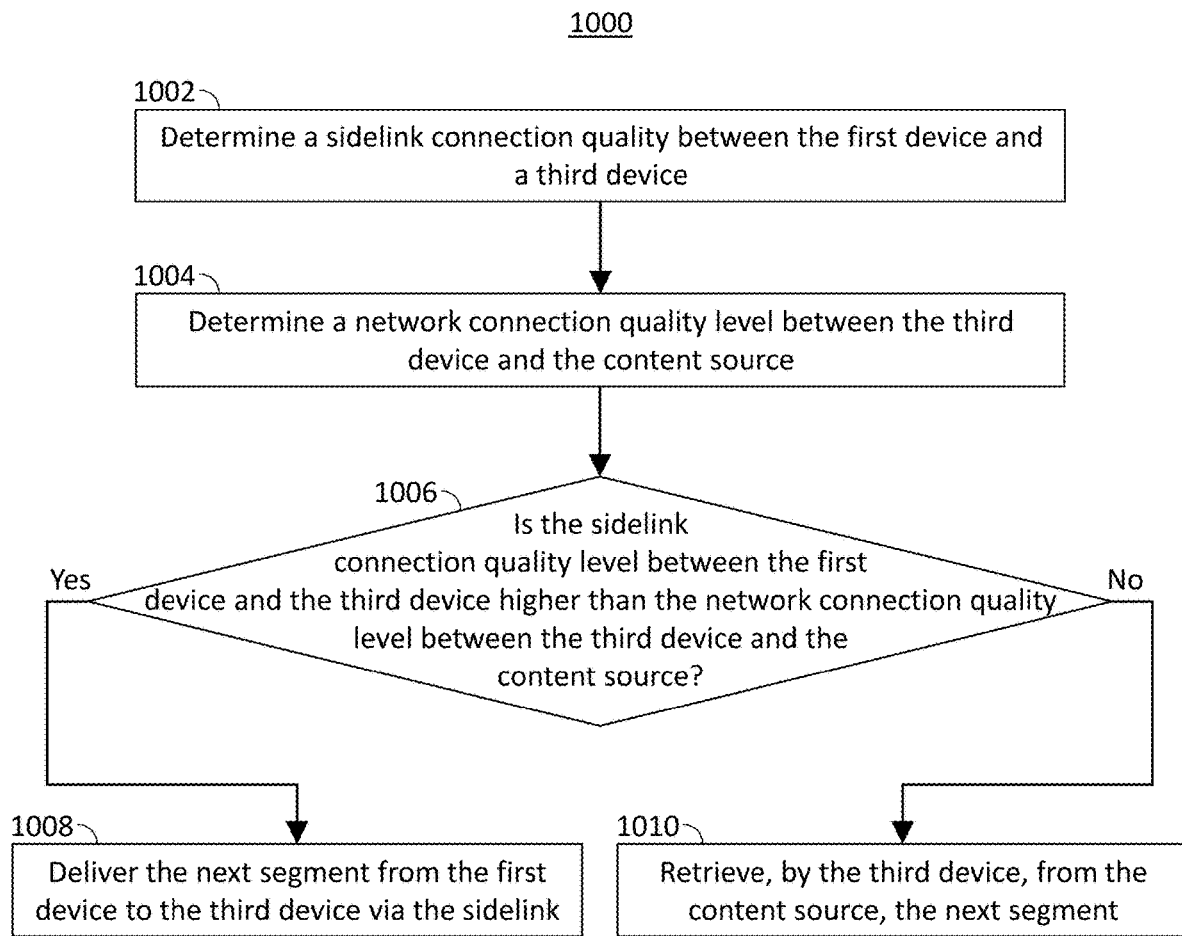
FIG. 10 is a flowchart representing an illustrative process for determining whether to retrieve a segment of media from a UE via the sidelink or from the content source, in accordance with some embodiments of the disclosure.

FIG. 10 is a flowchart representing an illustrative process 1000 for determining whether to retrieve a segment of media from a UE via the sidelink or from the content source, in accordance with some embodiments of the disclosure. Process 1000 may be implemented on control circuitry 512. In addition, one or more actions of process 1000 may be incorporated into or combined with one or more actions of any other process or embodiment described herein.

At 1002, control circuitry 512 determines a sidelink connection quality between the first device and a third device. This may be accomplished using methods described above in connection with FIG. 9. At 1004, control circuitry 512 determines a network connection quality level between the third device and the content source. This may also be accomplished using methods described above in connection with FIG. 6.

At 1006, control circuitry 512 determines whether the sidelink connection quality level between the first device and the third device is higher than the network connection quality level between the third device and the content source. If so ("Yes" at 1006), then, at 1008, control circuitry 512 delivers the next segment from the first device to the third device via the sidelink. If, however, the connection between the content source and the third device is of higher quality than the sidelink connection between the first device and the third device ("No" at 1006), then, at 1008, control circuitry 512 causes the third device to retrieve the next segment from the content source.

The actions or descriptions of FIG. 10 may be used with any other embodiment of this disclosure. In addition, the actions and descriptions described in relation to FIG. 10 may be done in suitable alternative orders or in parallel to further the purposes of this disclosure.

Figure 11:
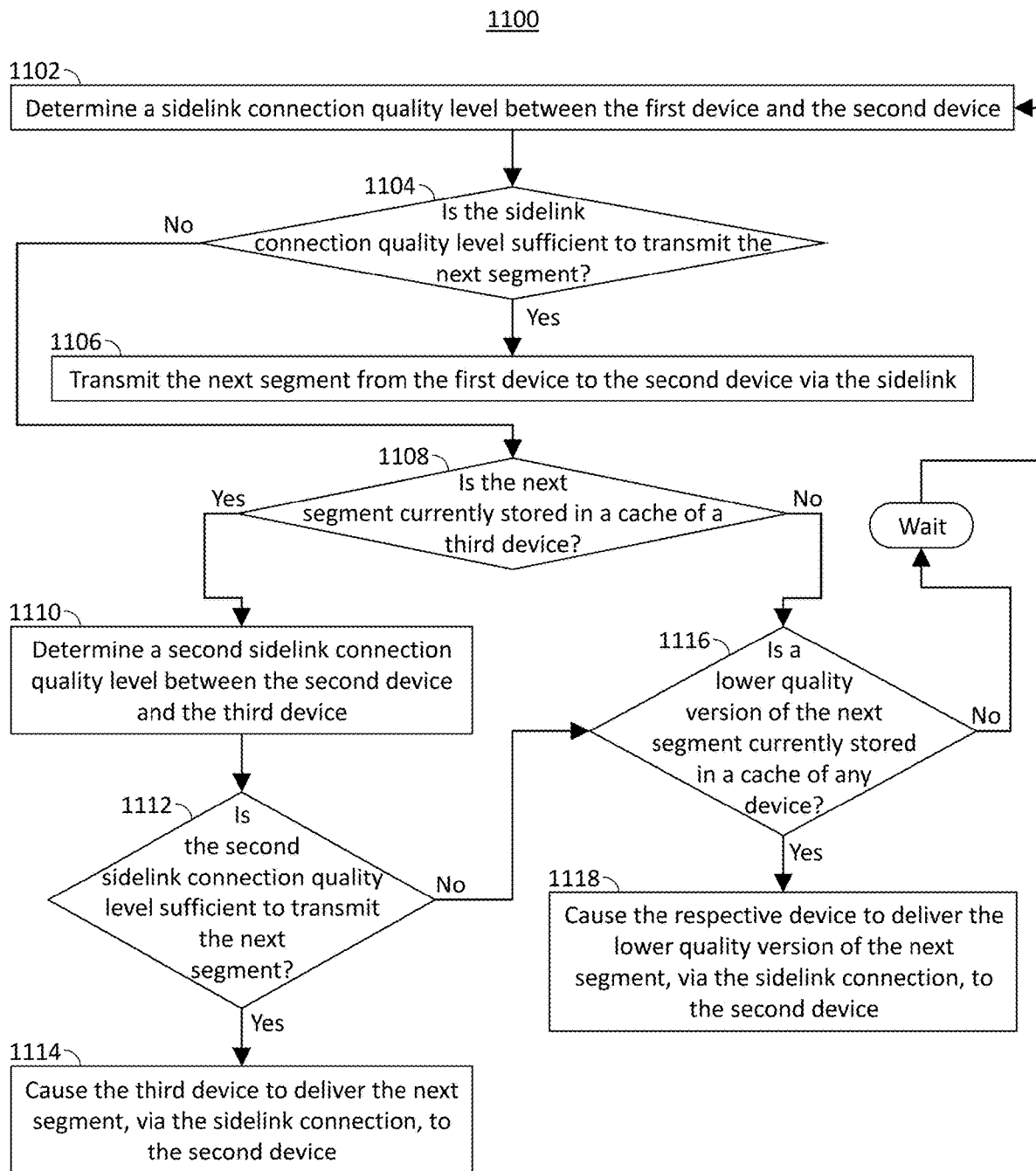
FIG. 11 is a flowchart representing an illustrative process for delivering different versions of a segment at different quality levels based on a sidelink connection quality, in accordance with some embodiments of the disclosure.

FIG. 11 is a flowchart representing an illustrative process 1100 for delivering different versions of a segment at different quality levels based on a sidelink connection quality, in accordance with some embodiments of the disclosure. Process 1100 may be implemented on control circuitry 512. In addition, one or more actions of process 1100 may be incorporated into or combined with one or more actions of any other process or embodiment described herein.

At 1102, control circuitry 512 determines a sidelink connection quality level between the first device and the second device. This may be accomplished using methods described above in connection with FIG. 9. At 1104, control circuitry 512 determines whether the sidelink connection quality level is sufficient to transmit the next segment. For example, if the sidelink connection has a data transfer rate of 20 Mbps, this may not be sufficient to transfer a segment encoded at 4K resolution in less than the amount of time equivalent to the duration of the media contained in the segment. However, a data transfer rate of 60 Mbps may be more than enough for effective transmission of a 4K segment. If the sidelink connection quality level is sufficient ("Yes" at 1104), then, at 1106, control circuitry 512 transmits the next segment from the first device to the second device via the sidelink.

If, however, the sidelink connection quality level is not sufficient to transmit the next segment ("No" at 1104), then, at 1108, control circuitry 512 determines whether the next segment is currently stored in a cache of a third device. This may be accomplished using methods described above in connection with FIG. 8. If the segment is stored in the cache of the third device ("Yes" at 1108), then, at 1110, control circuitry 512 determines a second sidelink connection quality level between the second device and the third device, again using methods described above in connection with FIG. 9. At 1112, control circuitry 512 determines whether the second sidelink connection quality level is sufficient to transmit the next segment, using methods similar to those described above in connection with action 1104.

If the second sidelink connection quality level is sufficient to transmit the next segment ("Yes" at 1112), then at 1114, control circuitry 512 causes the third device to deliver the next segment to the second device via the sidelink connection between the second device and the third device. For example, control circuitry 512 may transmit an instruction to the third device to transmit the segment from its cache to the second device.

If the second sidelink connection quality level is not sufficient to transmit the next segment ("No" at 1112), or if the next segment is not currently stored in the cache of the third device ("No" at 1108), then, at 1116, control circuitry 512 determines whether a lower quality version of the next segment is currently stored in the cache of any device of the plurality of devices in the D2D cluster. For example, control circuitry 512 may send a request for an indication of availability of the next segment to each device in the D2D cluster, specifying a segment index and a maximum quality level based on the sidelink connection quality. Each device from which any version of the requested segment is available may then respond with an indication of availability and an indication of quality level (e.g., resolution, audio quality, etc.). If no device responds with an indication of availability, meaning no lower resolution version is available ("No" at 1116), then control circuitry 512 may wait a predetermined period of time, such as the length of a segment (e.g., two seconds), before returning to 1102 to redetermine the sidelink connection quality level between the first device and the second device.

If a lower quality version of the segment is available ("Yes" at 1116), then, at 1118, control circuitry 512 causes the respective device from which the segment is available to deliver the lower quality version of the segment to the second device via the sidelink connection between the respective device and the second device. If the same quality level version of the segment is available from multiple devices, control circuitry 512 may select a specific device having the highest sidelink connection quality level with the second device to deliver the segment to the second device. If multiple quality level versions of the segment are available, control circuitry 512 may select the version of the segment having the highest quality level that does not exceed the capabilities of the sidelink connection between the device from which the segment is available and the second device. Control circuitry 512 then instructs that device to deliver the selected segment to the second device.

The actions or descriptions of FIG. 11 may be used with any other embodiment of this disclosure. In addition, the actions and descriptions described in relation to FIG. 11 may be done in suitable alternative orders or in parallel to further the purposes of this disclosure.

Figure 12:
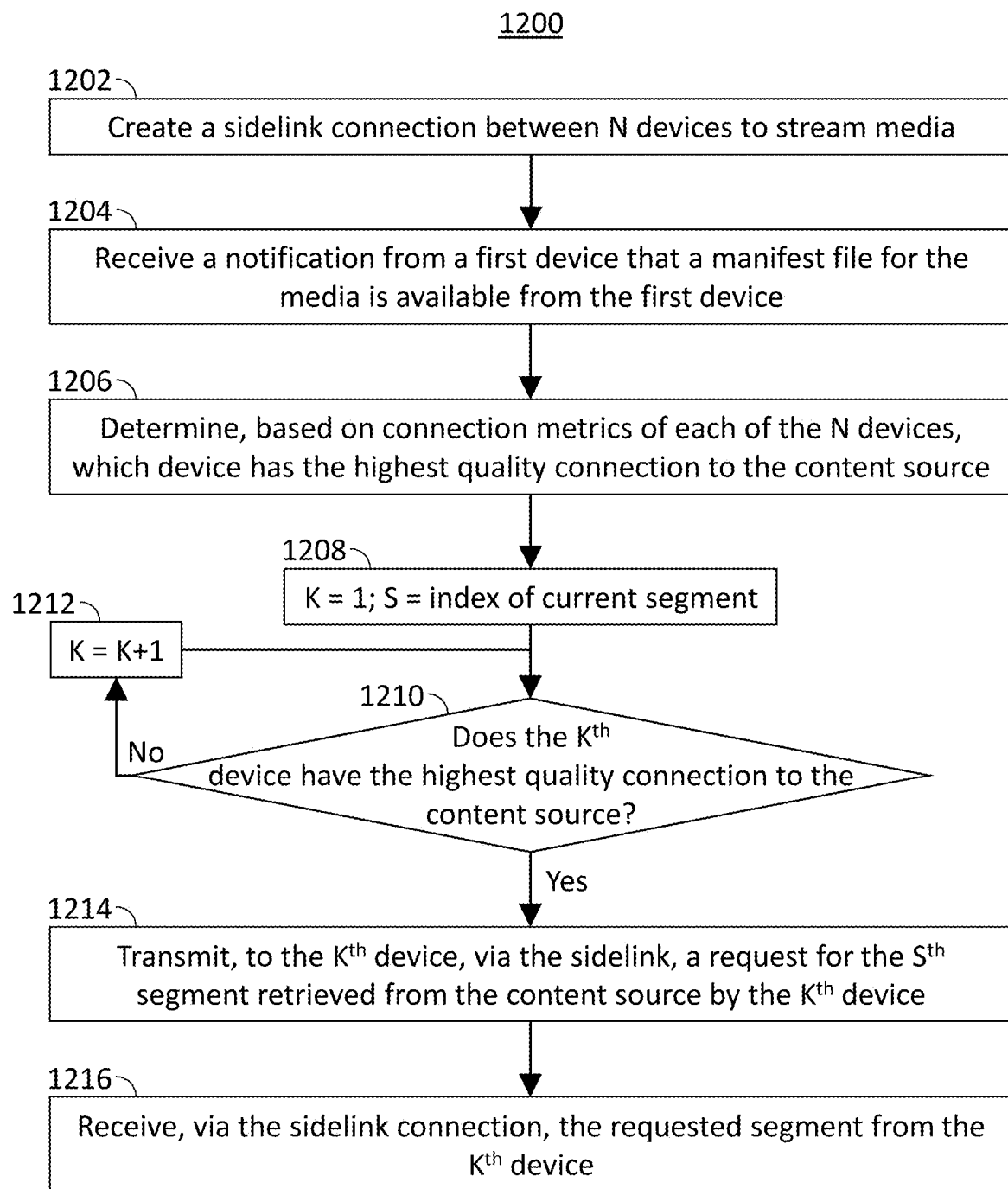
FIG. 12 is a flowchart representing an illustrative process for determining, by a UE not connected to the content source, a device from which to retrieve a segment of the media, in accordance with some embodiments of the disclosure.

FIG. 12 is a flowchart representing an illustrative process 1200 for determining, by a UE not connected to the content source, a device from which to retrieve a segment of the media, in accordance with some embodiments of the disclosure. Process 1200 may be implemented on control circuitry 512. In addition, one or more actions of process 1200 may be incorporated into or combined with one or more actions of any other process or embodiment described herein.

At 1202, control circuitry 512 creates a sidelink connection between N devices to stream media in a D2D cluster. This may be accomplished using methods described above in connection with FIG. 6. At 1204, control circuitry 512 receives a notification from a first device of the N devices that a manifest file for the media is available from the first device. For example, control circuitry 512 may monitor incoming transmissions from the sidelink and identify a transmission from the first device that includes a pointer or resource locator for the manifest file. Control circuitry 512 may retrieve the manifest file from the first device in response to the notification.

At 1206, control circuitry 512 determines, based on connection metrics of each of the N devices, which device has the highest quality connection to the content source. This may be accomplished using methods described above in connection with FIG. 6. At 1208, control circuitry 512 initializes a counter variable K, setting its value to one, and a variable S representing an index of the current segment of media to be requested. At 1210, control circuitry 512 determines whether the $K^{th}$ device has the highest quality connection to the content source. This may be accomplished using methods described above in connection with FIG. 6. If the $K^{th}$ device does not have the highest quality connection to the content source ("No" at 1210), then, at 1212, control circuitry 512 increments the value of K by one, and processing returns to 1210.

If the $K^{th}$ device has the highest quality connection to the content source ("Yes" at 1210), then, at 1214, control circuitry 512 transmits, to the $K^{th}$ device, via the sidelink, a request for the $S^{th}$ segment retrieved from the content source by the $K^{th}$ device. In response, at 1216, control circuitry 512 receives, from the $K^{th}$ device, the requested segment.

The actions or descriptions of FIG. 12 may be used with any other embodiment of this disclosure. In addition, the actions and descriptions described in relation to FIG. 12 may be done in suitable alternative orders or in parallel to further the purposes of this disclosure.

Figure 13:
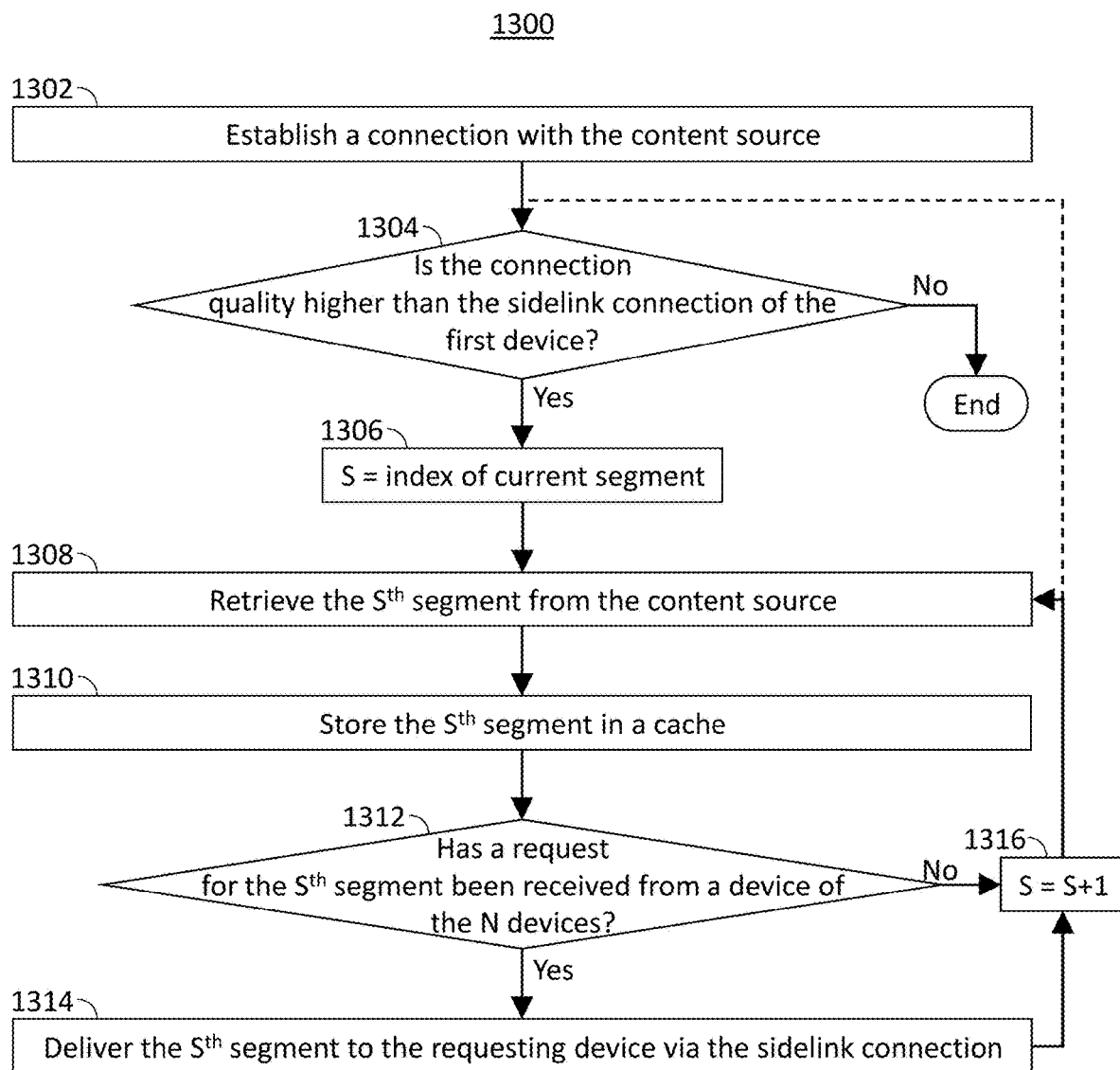
FIG. 13 is a flowchart representing an illustrative process for determining whether to retrieve a segment from another UE or the content source after establishing a connection with the content source during streaming of the media, in accordance with some embodiments of the disclosure.

FIG. 13 is a flowchart representing an illustrative process 1300 for determining whether to retrieve a segment from another UE or the content source after establishing a connection with the content source during streaming of the media, in accordance with some embodiments of the disclosure. Process 1300 may be implemented on control circuitry 512. In addition, one or more actions of process 1300 may be incorporated into or combined with one or more actions of any other process or embodiment described herein.

At 1302, control circuitry 512 establishes a connection with the content source. Until this point, the device on which control circuitry 512 resides may not have been connected to the content source and thus was using the sidelink connections with each other device in the D2D cluster for streaming of the media. The device may subsequently move into a coverage area of a network through which the device may connect to the content source.

At 1304, control circuitry 512 determines whether the connection quality between the device and the content source is higher than the sidelink connection of the device with other devices in the D2D cluster. If not ("No" at 1304), then the process ends, and the device continues relying on the sidelink for streaming of the media. If the connection with the content source is of higher quality than the sidelink connection ("Yes" at 1304), then, at 1306, control circuitry 512 initializes a variable S representing an index of the current segment and, at 1308, retrieves the $S^{th}$ segment from the content source. This may be accomplished using methods described above in connection with FIG. 6. At 1310, control circuitry 512 stored the $S^{th}$ segment in a cache of the device.

At 1312, control circuitry 512 determines whether a request for $S^{th}$ segment has been received from a device of the N devices. This may be accomplished using methods described above in connection with FIG. 6. If a request has been received ("Yes" at 1312), then, at 1314, control circuitry 512 delivers the $S^{th}$ segment to the requesting device. After delivering the $S^{th}$ segment to all devices from which requests were received, or if no device has requested the $S^{th}$ segment ("No" at 1312), at 1316, control circuitry 512 increments the value of S by one, and processing returns to 1308 where control circuitry 512 retrieves the next segment from the content source. In some embodiments, processing instead returns to 1304, where control circuitry 512 determines whether the connection between the device and the content source is still of higher quality than the sidelink connection.

The actions or descriptions of FIG. 13 may be used with any other embodiment of this disclosure. In addition, the actions and descriptions described in relation to FIG. 13 may be done in suitable alternative orders or in parallel to further the purposes of this disclosure.

Figure 14:
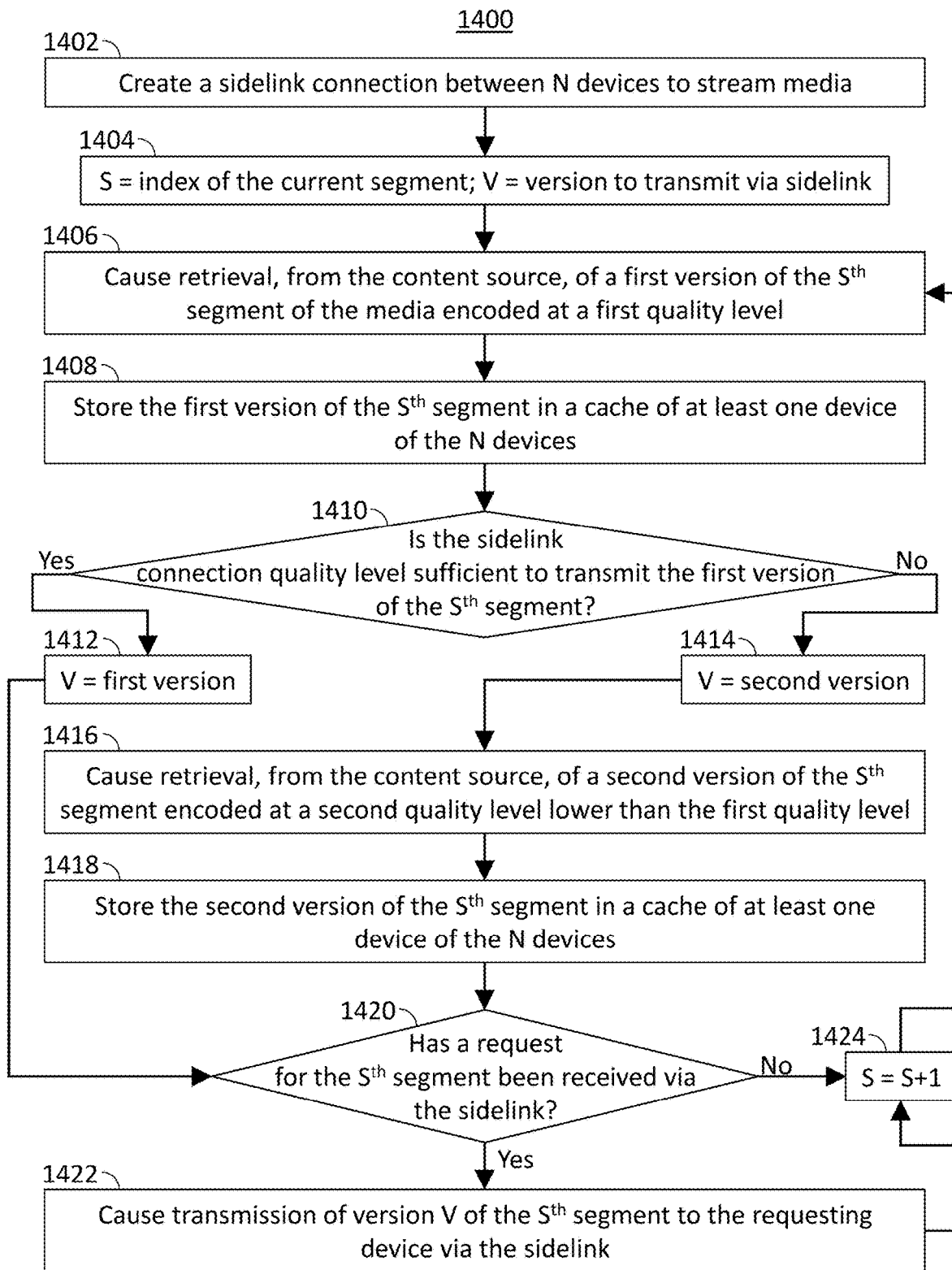
FIG. 14 is a flowchart representing an illustrative process for retrieving multiple versions of a segment of media, in accordance with some embodiments of the disclosure.

FIG. 14 is a flowchart representing an illustrative process 1400 for retrieving multiple versions of a segment of media, in accordance with some embodiments of the disclosure. Process 1400 may be implemented on control circuitry 512. In addition, one or more actions of process 1400 may be incorporated into or combined with one or more actions of any other process or embodiment described herein.

At 1402, control circuitry 512 creates a sidelink connection between N devices to stream media. This may be accomplished using methods described above in connection with FIG. 6. At 1404, control circuitry 512 initialized a variable S representing an index of the current segment of media to be retrieved from the content source, and a variable V representing the version of the content segment to transmit to other devices via the sidelink. At 1406, control circuitry 512 causes retrieval, from the content source, of a first version of the $S^{th}$ segment of the media encoded at a first quality level. The first quality level may be selected to be the highest available quality level for which the connection with the content source is sufficient. At 1408, control circuitry 512 stores the first version of the $S^{th}$ segment in a cache of at least one device of the N devices. For example, control circuitry 512 may store the first version of the $S^{th}$ segment in a cache of the device on which control circuitry 512 resides, in a cache of another device instructed by control circuitry 512 to retrieve the $S^{th}$ segment, or in the cache of more than one device.

At 1410, control circuitry 512 determines whether the sidelink connection quality level is sufficient to transmit the first version of the Sth segment. This may be accomplished using methods described above in connection with FIG. 11. If the sidelink connection quality level is sufficient for transmission of the first version of the Sth segment ("Yes" at 1410), then, at 1412, control circuitry 512 sets V to the first version. If the sidelink connection quality level is not sufficient for transmission of the first version of the Sth segment ("No" at 1410), then, at 1414, control circuitry 512 sets V to a second version. The second version may be selected based on the sidelink connection quality level, as described above in connection with FIG. 11.

At 1416, control circuitry 512 causes retrieval, from the content source, of the second version of the $S^{th}$ segment encoded at a second quality level lower than the first quality level. At 1418, control circuitry 512 stores the second version of the $S^{th}$ segment in a cache of at least one device of the N devices.

At 1420, control circuitry 512 determines whether a request for the $S^{th}$ segment has been received from a device via the sidelink. This may be accomplished using methods described above in connection with FIG. 6. If a request has been received ("Yes" at 1420), then, at 1422, control circuitry 512 causes transmission of version V of the $S^{th}$ segment to the requesting device via the sidelink. If version V of the segment is stored in the cache of the device on which control circuitry 512 resides, control circuitry 512 delivers it to the requesting device. If version V of the segment is stored in the cache of another device, control circuitry 512 may instruct that device to deliver it to the requesting device. After delivering the requested segment, or if no request was received ("No" at 1420), at 1424, control circuitry 512 increments the value of S by one, and processing returns to 1406.

The actions or descriptions of FIG. 14 may be used with any other embodiment of this disclosure. In addition, the actions and descriptions described in relation to FIG. 14 may be done in suitable alternative orders or in parallel to further the purposes of this disclosure.

Figure 15:
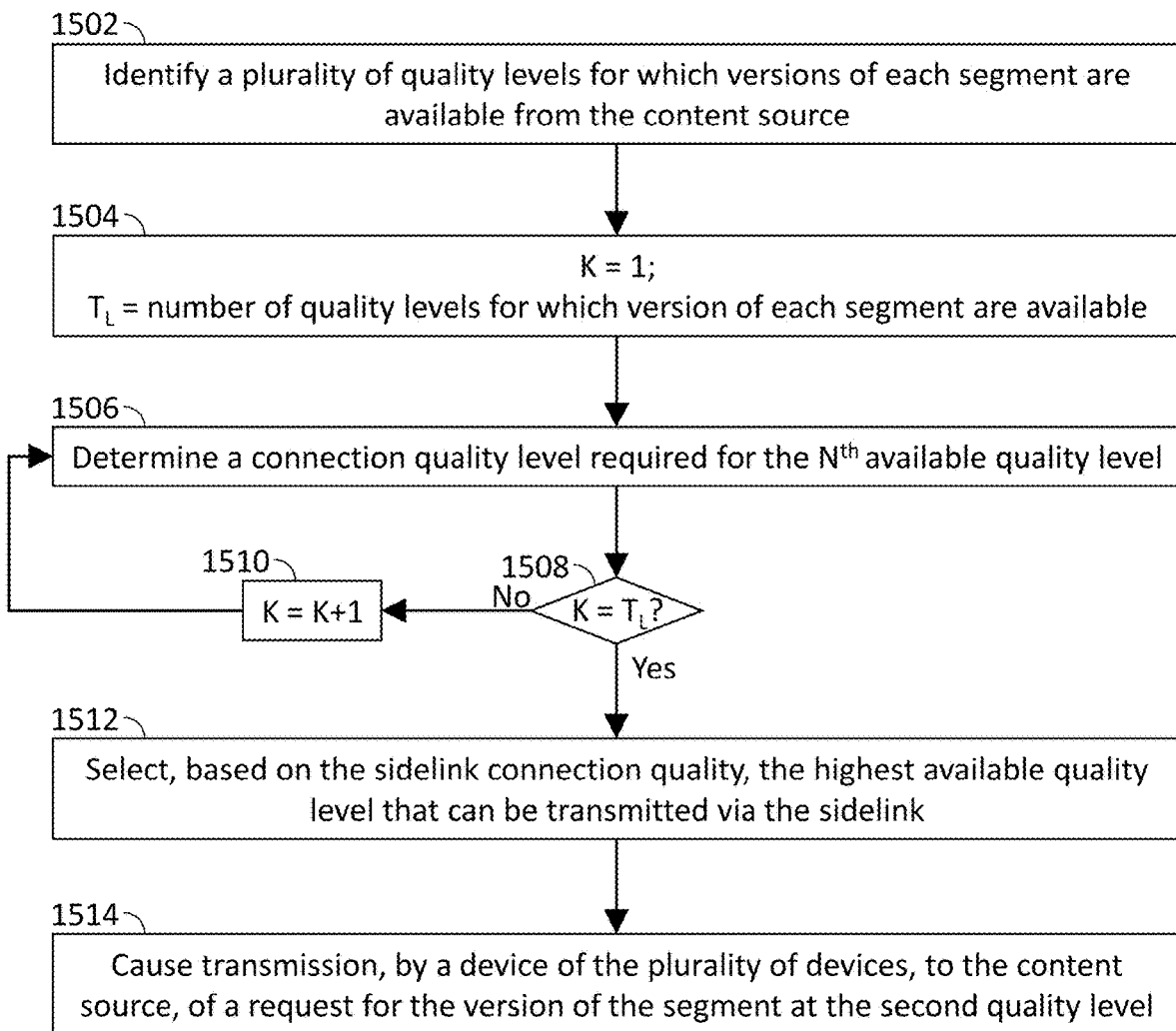
FIG. 15 is a flowchart representing an illustrative process for selecting a lower quality version of a segment, in accordance with some embodiments of the disclosure.

FIG. 15 is a flowchart representing an illustrative process 1500 for selecting a lower quality version of a segment, in accordance with some embodiments of the disclosure. Process 1500 may be implemented on control circuitry 512. In addition, one or more actions of process 1500 may be incorporated into or combined with one or more actions of any other process or embodiment described herein.

At 1502, control circuitry 512 identifies a plurality of quality levels for which version of each segment are available from the content source. For example, control circuitry 512 may access a list of available quality levels from the manifest file for the media. At 1504, control circuitry 512 initializes a counter variable K, settings its value to one, and a variable $T_L$ representing the number of available quality levels. At 1506, control circuitry 512 determines a connection quality level required for the $K^{th}$ available quality level. For example, control circuitry 512 may require that it take less time than the duration of media of a segment to fully transmit the segment. Control circuitry 512 may apply this requirement to the average data size of segments encoded at each quality level to determine a minimum data transfer rate needed to transmit the entire segment within the time limit. At 1508, control circuitry 512 determines whether K is equal to $T_L$, meaning that a required connection quality level has been determined for each segment quality level. If K is not equal to $T_L$, then, at 1510, control circuitry 512 increments the value of K by one, and processing returns to 1506.

If K is equal to $T_L$ ("Yes" at 1508), then, at 1512, control circuitry 512 selects, based on the sidelink connection quality, the highest available quality level than can be transmitted via the sidelink. For example, control circuitry 512 may compare a data transfer rate or other metric of the sidelink connection with the required connection quality levels for each available segment quality level. The highest available quality level whose required connection quality level does not exceed the sidelink connection quality is then selected. At 1514, control circuitry 512 causes transmission, by a device of the plurality of devices, to the content source, of a request for the version of the segment at the selected quality level.

The actions or descriptions of FIG. 15 may be used with any other embodiment of this disclosure. In addition, the actions and descriptions described in relation to FIG. 15 may be done in suitable alternative orders or in parallel to further the purposes of this disclosure.

Figure 16:
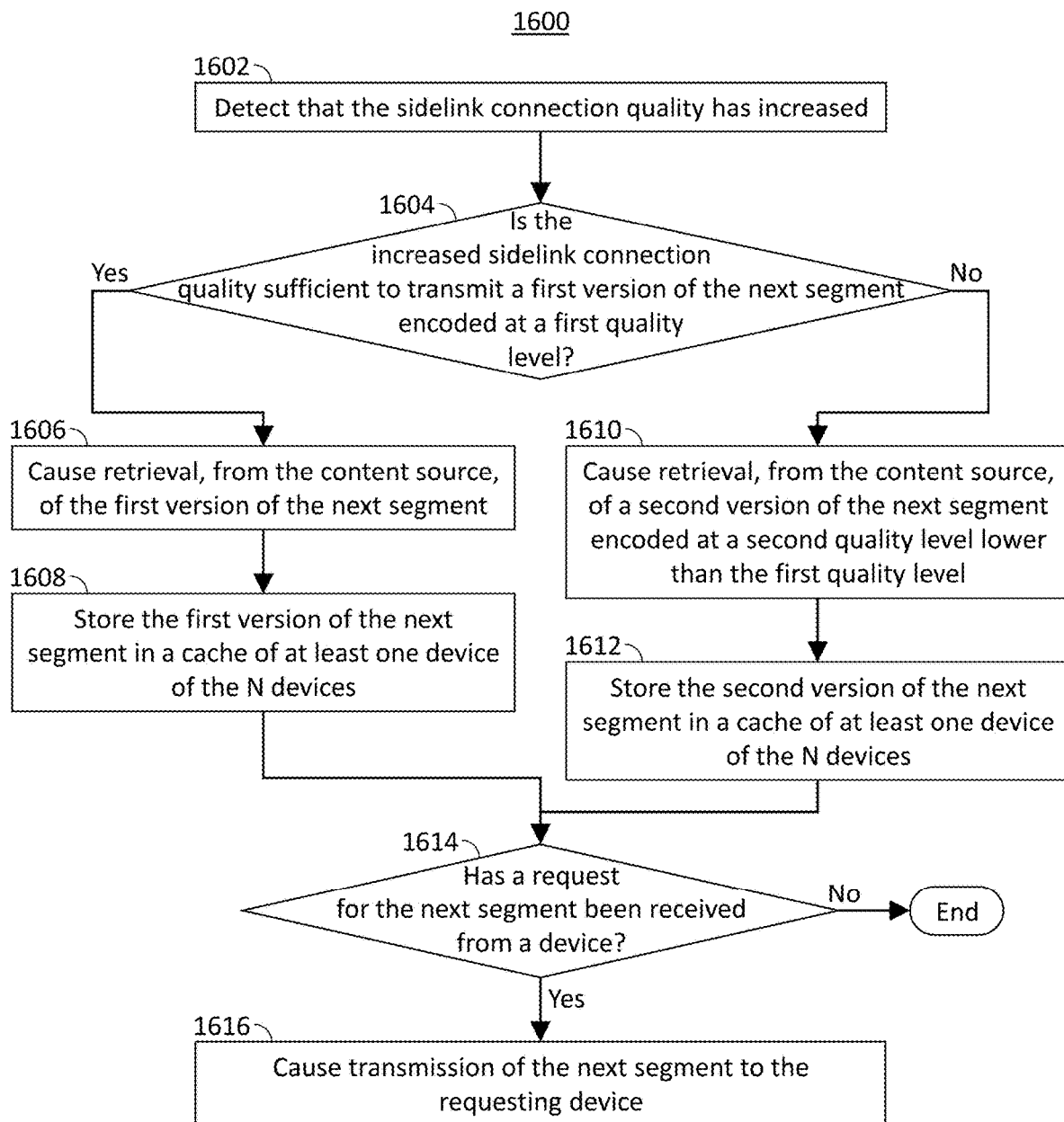
FIG. 16 is a flowchart representing an illustrative process for selecting and retrieving segments of a second quality level in response to an increase in sidelink connection quality, in accordance with some embodiments of the disclosure.

FIG. 16 is a flowchart representing an illustrative process 1600 for selecting and retrieving segments of a second quality level in response to an increase in sidelink connection quality, in accordance with some embodiments of the disclosure. Process 1600 may be implemented on control circuitry 512. In addition, one or more actions of process 1600 may be incorporated into or combined with one or more actions of any other process or embodiment described herein.

At 1602, control circuitry 512 detects that the sidelink connection quality has increased. For example, control circuitry 512 may periodically monitor or obtain connection metrics describing the sidelink connection. At each period, control circuitry 512 compares the connection metrics of the sidelink connection with the connection metrics obtained at the previous period. If the connection metrics have improved by a threshold amount, control circuitry 512 may determine that the sidelink connection quality has increased.

At 1604, control circuitry 512 determines whether the increased sidelink connection quality is sufficient to transmit a first version of the next segment encoded at a first quality level. For example, the current segment may be been encoded at a second, lower quality level. Control circuitry 512 may compare metrics of the sidelink connection with at least the next highest quality level, and in some cases all higher quality levels, to determine if the sidelink connection quality is now sufficient for transmission of segments encoded at any of the higher quality levels.

If the sidelink connection quality is now sufficient for a higher quality version of the next segment ("Yes" at 1604), then, at 1606, control circuitry 512 causes retrieval, from the content source, of the higher quality version of the next segment and, at 1608, stores the retrieved version of the segment in a cache of at least one device of the plurality of devices in the D2D cluster. This may be accomplished using methods described above in connection with FIG. 14. If the sidelink connection quality level is still not sufficient for transmission of a higher quality level segment ("No" at 1604), then, at 1610, control circuitry 512 causes retrieval, from the content source, of a second version of the next segment at the same lower quality level. At 1612, control circuitry stores the retrieved version of the segment in a cache of at least one device of the plurality of devices. Again, this may be accomplished using methods described above in connection with FIG. 14.

At 1614, control circuitry 512 determines whether a request for the next segment has been received from a device via the sidelink and, if so ("Yes" at 1614), at 1616, causes transmission of the next segment to the requesting device. Whichever quality level version of the segment that was retrieved will be transmitted, via the sidelink, to the requesting device. This may be accomplished using methods described above in connection with FIG. 6.

The actions or descriptions of FIG. 16 may be used with any other embodiment of this disclosure. In addition, the actions and descriptions described in relation to FIG. 16 may be done in suitable alternative orders or in parallel to further the purposes of this disclosure.

In some embodiments, control circuitry 512 may determine whether a device requesting to join the D2D cluster is associated with a user that subscribes to the content source. For example, the content source may be a subscription-based streaming service (e.g., Netflix). To prevent users that do not subscribe to the streaming service from joining the D2D cluster, control circuitry 512 may determine whether the user of a device also subscribes to the streaming service, or to an access level of the subscription service needed to stream the media. If control circuitry 512 determines that the user is a subscriber, then the device is permitted to join the D2D cluster and establish sidelink connections with other devices in the D2D cluster.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for media delivery in a cooperative streaming environment, the method comprising:

creating a sidelink connection between each device of a plurality of devices, wherein a first device of the plurality of devices is not connected to a content source for the media;

causing retrieval, from the content source, of a first version of a segment of the media encoded at a first quality level;

storing the first version of the segment in a cache of at least one device of the plurality of devices;

determining whether a sidelink connection quality level is sufficient to transmit the first version of the segment to other devices of the plurality of devices; and in response to determining that the sidelink connection quality level is not sufficient to transmit the first version of the segment to the other devices of the plurality of devices:

causing retrieval, from the content source, of a second version of the segment of the media encoded at a second quality level, wherein the second quality level is lower than the first quality level;
storing the second version of the segment in the cache of at least one device of the plurality of devices; and
causing transmission, in response to a request from the first device, via the sidelink connection, for the segment, of the second version of the segment to the first device.

2. The method of claim 1, wherein:
the first version of the segment is caused to be retrieved by a second device; and
the second version of the segment is caused to be retrieved by a third device.

3. The method of claim 1, wherein:
the first version of the segment is stored in a cache of a second device; and
the second version of the segment is stored in a cache of a third device.

4. The method of claim 1, further comprising:
causing transmission, by a device of the plurality of devices, to the content source, of a request for the first version of the segment.

5. The method of claim 1, further comprising:
determining a connection quality level of a connection between a device of the plurality of devices and the content source; and
selecting, based on the connection quality level, the first quality level.

6. The method of claim 1, further comprising:
selecting, based on the sidelink connection quality level, the second quality level; and
causing transmission, by a device of the plurality of devices, to the content source, of a request for the second version of the segment.

7. The method of claim 1, wherein the first version of the segment and the second version of the segment are stored in a cache of a second device assigned by the sidelink connection to cache segments of the media.

8. The method of claim 7, further comprising:
causing transmission of the request from the first device, via the sidelink connection, to the second device.

9. The method of claim 1, further comprising:
detecting that the sidelink connection quality level has increased;
determining whether the increased sidelink connection quality level is sufficient to transmit a first version of a second segment of the media encoded at the first quality level;
in response to determining that the increased sidelink connection quality level is sufficient to transmit the first version of the second segment:
causing retrieval, from the content source, of the first version of the second segment;
storing the first version of the second segment in the cache of at least one device of the plurality of devices; and
causing transmission, in response to a request from the first device, via the sidelink connection, for the second segment, of the first version of the second segment to the first device.

10. The method of claim 9, further comprising:
in response to determining that the increased sidelink connection quality level is not sufficient to transmit the first version of the second segment:
causing retrieval, from the content source, of a second version of the second segment encoded at the second quality level;
storing the second version of the second segment in the cache of at least one device of the plurality of devices; and
causing transmission, in response to a request from the first device, via the sidelink connection, for the second segment, of the second version of the second segment to the first device.

11. A system for media delivery in a cooperative streaming environment, the system comprising:
transceiver circuitry; and
control circuitry configured to:
create a sidelink connection between each device of a plurality of devices, wherein a first device of the plurality of devices is not connected to a content source for the media;
cause retrieval, using the transceiver circuitry, from the content source, of a first version of a segment of the media encoded at a first quality level;
store the first version of the segment in a cache of at least one device of the plurality of devices;
determine whether a sidelink connection quality level is sufficient to transmit the first version of the segment to other devices of the plurality of devices; and
in response to determining that the sidelink connection quality level is not sufficient to transmit the first version of the segment to the other devices of the plurality of devices:
cause retrieval, using the transceiver circuitry, from the content source, of a second version of the segment of the media encoded at a second quality level, wherein the second quality level is lower than the first quality level;
store the second version of the segment in the cache of at least one device of the plurality of devices; and
cause transmission, using the transceiver circuitry, in response to a request from the first device, via the sidelink connection, for the segment, of the second version of the segment to the first device.

12. The system of claim 11, wherein:
the first version of the segment is caused to be retrieved by a second device; and
the second version of the segment is caused to be retrieved by a third device.

13. The system of claim 11, wherein:
the first version of the segment is stored in a cache of a second device; and
the second version of the segment is stored in a cache of a third device.

14. The system of claim 11, wherein the control circuitry is further configured to:
cause transmission, using the transceiver circuitry, by a device of the plurality of devices, to the content source, of a request for the first version of the segment.

15. The system of claim 11, wherein the control circuitry is further configured to:
determine a connection quality level of a connection between a device of the plurality of devices and the content source; and
select, based on the connection quality level, the first quality level.

16. The system of claim 11, wherein the control circuitry is further configured to:
select, based on the sidelink connection quality level, the second quality level; and cause transmission, using the transceiver circuitry, by a device of the plurality of devices, to the content source, of a request for the second version of the segment.

17. The system of claim 11, wherein the first version of the segment and the second version of the segment are stored in a cache of a second device assigned by the sidelink connection to cache segments of the media.

18. The system of claim 17, wherein the control circuitry is further configured to:
cause transmission, using the transceiver circuitry, of the request from the first device, via the sidelink connection, to the second device.

19. The system of claim 11, wherein the control circuitry is further configured to:
detect that the sidelink connection quality level has increased;
determine whether the increased sidelink connection quality level is sufficient to transmit a first version of a second segment of the media encoded at the first quality level;
in response to determining that the increased sidelink connection quality level is sufficient to transmit the first version of the second segment:
cause retrieval, using the transceiver circuitry, from the content source, of the first version of the second segment;
store the first version of the second segment in the cache of at least one device of the plurality of devices; and
cause transmission, using the transceiver circuitry, in response to a request from the first device, via the sidelink connection, for the second segment, of the first version of the second segment to the first device.

20. The system of claim 19, wherein the control circuitry is further configured to:
in response to determining that the increased sidelink connection quality level is not sufficient to transmit the first version of the second segment:
cause retrieval, using the transceiver circuitry, from the content source, of a second version of the second segment encoded at the second quality level;
store the second version of the second segment in the cache of at least one device of the plurality of devices; and
cause transmission, using the transceiver circuitry, in response to a request from the first device, via the sidelink connection, for the second segment, of the second version of the second segment to the first device.

\* \* \* \* \*